(12) United States Patent
Ootorii

(10) Patent No.: US 10,558,003 B2
(45) Date of Patent: Feb. 11, 2020

(54) OPTICAL WAVEGUIDE SHEET, OPTICAL TRANSMISSION MODULE, AND MANUFACTURING METHOD FOR AN OPTICAL WAVEGUIDE SHEET

(71) Applicant: SONY CORPORATION, Tokyo (JP)

(72) Inventor: Hiizu Ootorii, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/070,127

(22) PCT Filed: Jan. 10, 2017

(86) PCT No.: PCT/JP2017/000476
§ 371 (c)(1),
(2) Date: Jul. 13, 2018

(87) PCT Pub. No.: WO2017/134985
PCT Pub. Date: Aug. 10, 2017

(65) Prior Publication Data
US 2019/0025527 A1 Jan. 24, 2019

(30) Foreign Application Priority Data
Feb. 1, 2016 (JP) .................. 2016-017116

(51) Int. Cl.
*G02B 6/26* (2006.01)
*G02B 6/42* (2006.01)

(52) U.S. Cl.
CPC ............. *G02B 6/4214* (2013.01); *G02B 6/42* (2013.01)

(58) Field of Classification Search
CPC ........ G02B 6/26; G02B 6/4214; G02B 6/262; G02B 6/32; G02B 6/34
See application file for complete search history.

(56) References Cited

U.S. PATENT DOCUMENTS

2011/0243499 A1* 10/2011 Fujiwara ............. G02B 6/1221
385/31
2013/0230276 A1 9/2013 Lee

FOREIGN PATENT DOCUMENTS

JP 2004-341454 A 12/2004
JP 2006-162850 A 6/2006
(Continued)

OTHER PUBLICATIONS

International Search Report and Written Opinion of PCT Application No. PCT/JP2017/000476, dated Mar. 21, 2017, 11 pages of ISRWO.

*Primary Examiner* — Jennifer Doan
(74) *Attorney, Agent, or Firm* — Chip Law Group

(57) ABSTRACT

[Object] To provide an optical waveguide sheet including a mirror structure that can be fabricated at low cost and has a high smoothness, an optical transmission module, and a manufacturing method for an optical waveguide sheet. [Solving Means] An optical waveguide sheet according to the present technology includes a core, a cladding, and a mirror structure. The core extends in a first direction parallel to a first plane. The cladding is provided around the core. The mirror structure has a concave shape which is formed from the cladding to the core, the mirror structure including a first inclined surface that is parallel to a second direction perpendicular to the first direction and parallel to the first plane, is inclined with respect to the first plane, and includes a core region in which the core is exposed, and a bottom surface parallel to the first plane.

9 Claims, 21 Drawing Sheets

(56) References Cited

FOREIGN PATENT DOCUMENTS

| | | |
|---|---|---|
| JP | 2006-235126 A | 9/2006 |
| JP | 2009-258563 A | 11/2009 |
| JP | 4442463 B2 | 3/2010 |
| JP | 4539031 B2 | 9/2010 |
| JP | 2010-266899 A | 11/2010 |
| JP | 2011-081142 A | 4/2011 |
| JP | 5278275 B2 | 9/2013 |
| JP | 5319954 B2 | 10/2013 |
| JP | 2014-026152 A | 2/2014 |
| TW | 201338640 A | 9/2013 |
| WO | 2009/131231 A1 | 10/2009 |

* cited by examiner

OPTICAL WAVEGUIDE SHEET, OPTICAL TRANSMISSION MODULE, AND MANUFACTURING METHOD FOR AN OPTICAL WAVEGUIDE SHEET

CROSS REFERENCE TO RELATED APPLICATIONS

This application is a U.S. National Phase of International Patent Application No. PCT/JP2017/000476 filed on Jan. 10, 2017, which claims priority benefit of Japanese Patent Application No. JP 2016-017116 filed in the Japan Patent Office on Feb. 1, 2016. Each of the above-referenced applications is hereby incorporated herein by reference in its entirety.

TECHNICAL FIELD

The present technology relates to an optical waveguide sheet and an optical transmission module that can be used for optical communication and to a manufacturing method for an optical waveguide sheet.

BACKGROUND ART

As an optical transmission path through which optical signals can be transmitted, an optical waveguide sheet including cores formed on a sheet-like base material and coated with a cladding is used. An optical connector is used for connecting a connection target object provided with a photoelectric conversion element to the optical waveguide sheet.

The optical connector includes a vertical-type optical connector by which the optical waveguide sheet is perpendicularly connected to a connection target surface and a horizontal-type optical connector by which the optical waveguide sheet is horizontally connected to a connection target surface. For installing the optical connector in a customer device, the horizontal-type optical connector is more advantageous in view of reductions in thickness and cost.

In this case, the optical connector needs to emit optical signals, which travel in a direction parallel to the connection target surface, through the optical waveguide sheet toward the photoelectric conversion element positioned in a direction perpendicular to the connection target surface. For example, Patent Literature 1 has disclosed an optical waveguide device including cores extending in parallel with a connection target surface and inclined mirror surfaces that are provided at both ends of the cores and reflect optical signals emitted from the cores in a direction perpendicular to the connection target surface.

CITATION LIST

Patent Literature

Patent Literature 1: Japanese Patent Application Laid-open No. 2006-162850

DISCLOSURE OF INVENTION

Technical Problem

In the optical waveguide device as described in Patent Literature 1, light is reflected on the inclined mirrors, and thus it is necessary to smooth the inclined mirrors and reduce loss components of light due to diffused reflection. On the other hand, in a case where a step of polishing the inclined mirrors and the like is necessary, it becomes difficult to reduce the manufacture cost of the optical waveguide sheet.

In view of the above-mentioned circumstances, it is an object of the present technology to provide an optical waveguide sheet including a mirror structure that can be fabricated at low cost and has a high smoothness, an optical transmission module, and a manufacturing method for an optical waveguide sheet.

Solution to Problem

In order to accomplish the above-mentioned object, an optical waveguide sheet according to an embodiment of the present technology includes a core, a cladding, and a mirror structure.

The core extends in a first direction parallel to a first plane.

The cladding is provided around the core.

The mirror structure has a concave shape which is formed from the cladding to the core, the mirror structure including a first inclined surface that is parallel to a second direction perpendicular to the first direction and parallel to the first plane, is inclined with respect to the first plane, and includes a core region in which the core is exposed, and a bottom surface parallel to the first plane.

With this configuration, the core region functions as a light reflection surface due to a refractive index difference between the air inside the structure having the concave shape and the core material. The first inclined surface can be smoothed by forming the mirror structure in a shape including the first inclined surface and the bottom surface when forming the mirror structure by cutting. Thus, it is possible to prevent diffused reflection of light in the core region and to reduce loss components of light due to reflection.

The mirror structure may further include a second inclined surface symmetric to the first inclined surface with respect to a plane perpendicular to the first direction.

By cutting the second inclined surface, the bottom surface, and the first inclined surface in the stated order, it is possible to form the mirror structure.

The mirror structure may include a first side surface that is parallel to the first direction, is perpendicular to the first plane, and has a trapezoidal shape, and a second side surface that is parallel to the first direction, is perpendicular to the first plane, is opposed to the first side surface in the second direction, and has a trapezoidal shape.

The core may include a plurality of cores arranged in the second direction, and the mirror structure may include a plurality of mirror structures including the first inclined surfaces each including each of core regions in which the plurality of cores are exposed.

The plurality of mirror structures may be at different positions in the first direction between adjacent mirror structures.

The optical waveguide sheet may further include a sheet-like base material, in which the core may be formed on the base material, and the cladding may be formed on the base material and the core.

The optical waveguide sheet may further include a sheet-like base material, in which the cladding may include a first cladding formed on the base material and a second cladding formed on the first cladding and the core.

In order to accomplish the above-mentioned object, an optical transmission module according to an embodiment of the present technology includes an optical waveguide sheet, a first optical connector, and a second optical connector.

The optical waveguide sheet includes
a core extending in a first direction parallel to a first plane, a cladding provided around the core, and a first mirror structure having a concave shape which is formed from the cladding to the core, the first mirror structure including a first inclined surface that is parallel to a second direction perpendicular to the first direction and parallel to the first plane, is inclined with respect to the first plane, and includes a core region in which the core is exposed, and a first bottom surface parallel to the first plane, and a second mirror structure having a concave shape which is formed from the cladding to the core, the second mirror structure including a third inclined surface that is parallel to the second direction, is inclined with respect to the first plane, and includes a core region in which the core is exposed, and a second bottom surface parallel to the first plane.

The first optical connector causes light to enter the first inclined surface.

Light emitted from the third inclined surface enters the second optical connector.

With this configuration, as described above, it is possible to reduce loss components of light at the first inclined surface of the first mirror structure and the second inclined surface of the second mirror structure. Thus, it is possible to transmit high-integrity optical signals between the first optical connector and the second optical connector.

In order to accomplish the above-mentioned object, a manufacturing method for an optical waveguide sheet according to an embodiment of the present technology includes:

preparing an optical waveguide sheet member including a core extending in a first direction parallel to a first plane and a cladding provided around the core; and forming a first inclined surface including a core region in which the core is exposed by cutting the optical waveguide sheet member along a first route that is parallel to a second direction perpendicular to the first direction and parallel to the first plane and is inclined with respect to the first plane, and forming a bottom surface parallel to the first plane by cutting the optical waveguide sheet member along a second route continuous with the first route and parallel to the first plane.

In accordance with this manufacturing method, it is possible to smooth the first inclined surface and manufacture an optical waveguide sheet including a mirror structure having reduced loss components of light due to reflection on the core region.

The step of forming the first inclined surface and the bottom surface may further include forming a second inclined surface including a core region in which the core is exposed by cutting the optical waveguide sheet member along a third route which is continuous with the second route, is inclined with respect to the first plane, and is symmetric to the first route with respect to a plane perpendicular to the first direction.

The step of preparing the optical waveguide sheet member may include
applying a core material onto a sheet member,
transferring a shape of a groove to the core material by rotating a cylindrical transfer roll having a cylindrical surface in which the groove is formed while pressing the cylindrical transfer roll against the core material,
forming a core by curing the core material,
applying a cladding material onto the sheet member and the core, and
forming a cladding by curing the cladding material.

The sheet member may be a base material, and
the step of applying the core material onto the sheet member may include applying the core material onto the base material.

The sheet member may include a base material and a lower cladding layer stacked on the base material, and
the step of applying the core material onto the sheet member may include applying the core material onto the lower cladding layer.

Advantageous Effects of Invention

As described above, in accordance with the present technology, it is possible to provide an optical waveguide sheet including a mirror structure that can be fabricated at low cost and has a high smoothness, an optical transmission module, and a manufacturing method for an optical waveguide sheet. It should be noted that the effects described here are not necessarily limitative and any effect described in the present disclosure may be provided.

BRIEF DESCRIPTION OF DRAWINGS

FIG. A perspective view of an optical transmission module according to an embodiment of the present technology.

FIG. A cross-sectional view of the optical transmission module.

Figure 1:
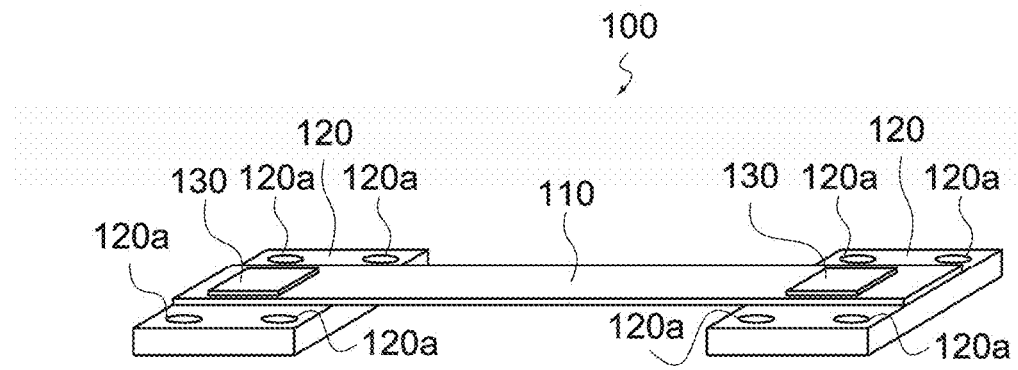

FIG. A cross-sectional view of an optical waveguide sheet provided in the optical transmission module.

FIG. A plan view of the optical waveguide sheet.

FIG. A cross-sectional view of the optical waveguide sheet.

FIG. A plan view of the optical waveguide sheet.

FIG. A cross-sectional view of a mirror structure provided in the optical waveguide sheet.

FIG. A perspective view of the mirror structure provided in the optical waveguide sheet.

FIG. A schematic view of the mirror structure provided in the optical waveguide sheet.

FIG. A schematic view of the mirror structure provided in the optical waveguide sheet.

FIG. A schematic view showing an operation of mirror structures provided in the optical waveguide sheet.

FIG. A schematic view showing an arrangement of the mirror structures provided in the optical waveguide sheet.

FIG. A schematic view showing the arrangement of the mirror structures provided in the optical waveguide sheet.

FIG. A schematic view showing a manufacturing method for an optical waveguide sheet.

FIG. A schematic view showing manufacturing processes of the optical waveguide sheet.

FIG. A schematic view showing the manufacturing processes of the optical waveguide sheet.

FIG. A schematic view showing the manufacturing processes of the optical waveguide sheet.

FIG. A schematic view showing the manufacturing processes of the optical waveguide sheet.

FIG. A schematic view showing a cylindrical transfer roll used in the manufacturing method for an optical waveguide sheet.

FIG. A schematic view showing a formation method for the mirror structure provided in the optical waveguide sheet.

FIG. A schematic view showing the formation method for the mirror structure provided in the optical waveguide sheet.

FIG. A schematic view showing manufacturing processes of the optical transmission module according to the embodiment of the present technology.

FIG. A schematic view showing the manufacturing processes of the optical transmission module according to the embodiment of the present technology.

FIG. A schematic view showing the manufacturing processes of the optical transmission module according to the embodiment of the present technology.

FIG. A schematic view showing the manufacturing processes of the optical transmission module according to the embodiment of the present technology.

FIG. A schematic view showing the manufacturing processes of the optical transmission module according to the embodiment of the present technology.

FIG. A schematic view showing the manufacturing processes of the optical transmission module according to the embodiment of the present technology.

FIG. A schematic view showing the manufacturing processes of the optical transmission module according to the embodiment of the present technology.

FIG. A schematic view showing the manufacturing processes of the optical transmission module according to the embodiment of the present technology.

FIG. A schematic view showing the manufacturing processes of the optical transmission module according to the embodiment of the present technology.

FIG. A schematic view showing the manufacturing processes of the optical transmission module according to the embodiment of the present technology.

FIG. A schematic view showing the manufacturing processes of the optical transmission module according to the embodiment of the present technology.

FIG. A schematic view showing the manufacturing processes of the optical transmission module according to the embodiment of the present technology.

FIG. A schematic view showing the manufacturing processes of the optical transmission module according to the embodiment of the present technology.

FIG. A schematic view showing the manufacturing processes of the optical transmission module according to the embodiment of the present technology.

FIG. A cross-sectional view of a mirror structure provided in an optical waveguide sheet according to a modified example of the present technology.

FIG. A cross-sectional view of an optical waveguide sheet according to a modified example of the present technology.

FIG. A cross-sectional view of a mirror structure provided in the optical waveguide sheet according to the modified example of the present technology.

MODE(S) FOR CARRYING OUT THE INVENTION

An optical transmission module according to an embodiment of the present technology will be described.

[Configuration of Optical Transmission Module]

Figure 2:
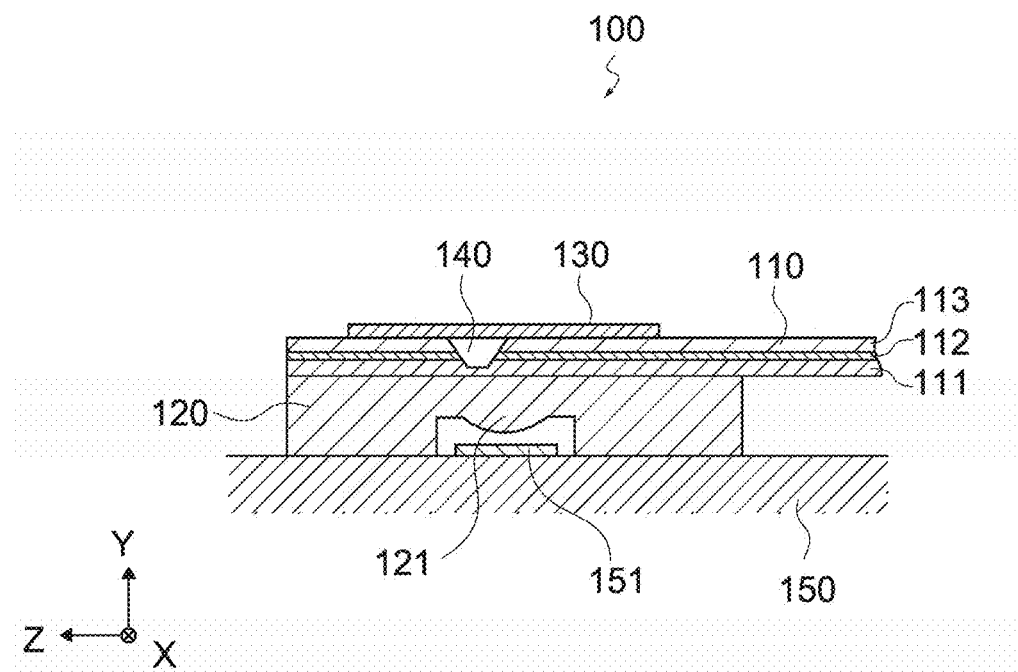

FIG. 1 is a perspective view showing a configuration of an optical transmission module 100 according to an embodiment of the present technology. FIG. 2 is a cross-sectional view of the optical transmission module 100 and a connection target object 150. Note that three directions orthogonal to one another in the following figures will be defined an X direction, a Y direction, and a Z direction, respectively.

As shown in these figures, the optical transmission module 100 includes an optical waveguide sheet 110, optical connectors 120, and protection sheets 130. The optical waveguide sheet 110 is extended in the Z direction, and the optical connectors 120 are respectively provided at both ends of the optical waveguide sheet 110. Note that the optical connector 120 may be provided at only one end of the optical waveguide sheet 110.

Figure 3:
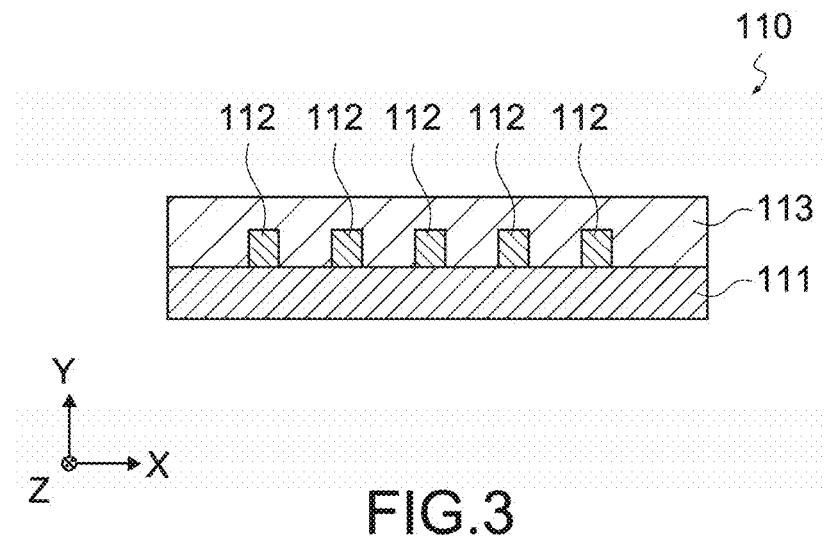

The optical waveguide sheet 110 transmits optical signals between the optical connectors 120. FIG. 3 is a cross-sectional view of the optical waveguide sheet 110. As shown in the figure, the optical waveguide sheet 110 includes a base material 111, cores 112, and a cladding 113.

The base material 111 is a sheet-like member made of synthetic resin and the like and is favorably flexible. The base material 111 is made of polyethylene terephthalate (PET), for example. The base material 111 can have a thickness (in Y direction) of 100 μm, for example, and can have a width (in X direction) of 300 mm, for example.

Figure 4:
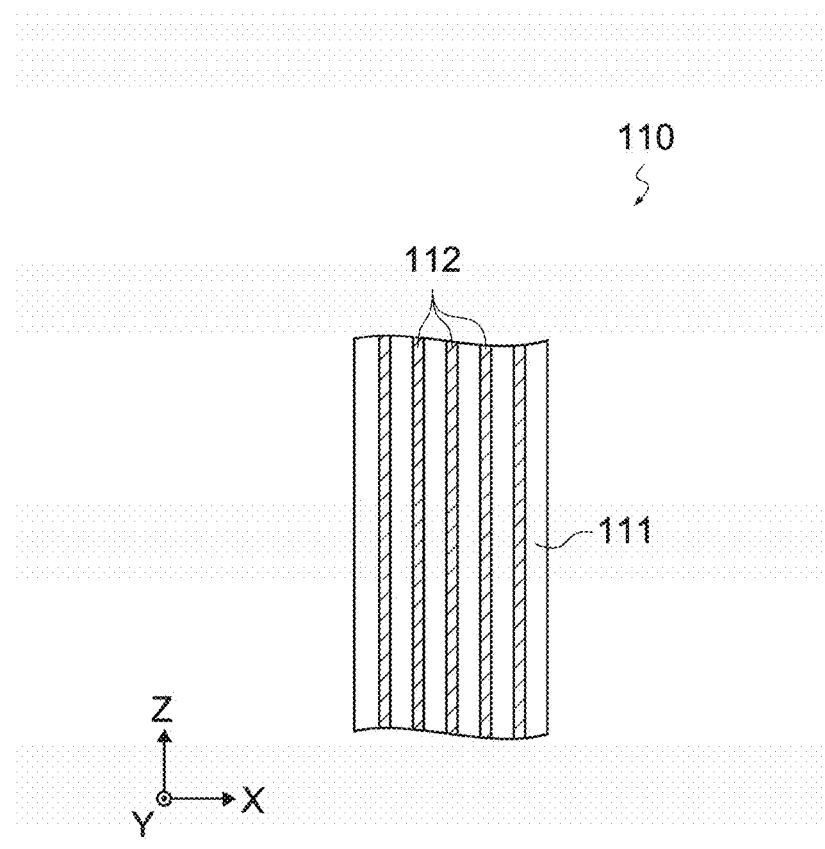

The cores 112 are disposed on the base material 111. FIG. 4 is a plan view showing the cores 112, from which the illustration of the cladding 113 is omitted. As shown in the figure, the plurality of cores 112 each extend in the Z direction and are spaced apart from one another in a direction (X direction) orthogonal to the extending direction (Z direction).

The core 112 is formed of a material having a high light permeability and having a refractive index higher than that of the base material 111 and the cladding 113. For example, ultraviolet curable resin can be used as the material of the core 112. The diameter of the core 112 can have a width (in X direction) and a height (in Y direction) of 50 μm, for example. The intervals (in X direction) of the cores 112 can be 125 μm, for example. The number of cores 112 is not limited to that shown in the figure, and can be one to several hundreds of cores 112.

The cladding 113 is disposed on the base material 111 and the cores 112. For example, ultraviolet curable resin having a refractive index lower than that of the core 112 can be used as the material of the cladding 113. The cladding 113 can have a thickness (in Y direction) of 100 μm, for example.

The optical waveguide sheet 110 has the configuration as described above. The cores 112 are coated with the base material 111 and the cladding 113, and light entering the cores 112 is transmitted while reflected on interfaces between the cores 112 and the base material 111 or interfaces between the cores 112 and the cladding 113. Thus, the cores 112 function as optical waveguides.

Although the dimensions of the optical waveguide sheet 110 are not particularly limited, the optical waveguide sheet 110 can have a width (in X direction) of 10 mm and a length (in Z direction) of 80 mm, for example.

The optical connector 120 connects the optical waveguide sheet 110 to the connection target object 150 (see FIG. 2). The optical connector 120 can be made of synthetic resin and the like having a high light permeability. As shown in FIGS. 1 and 2, the optical connector 120 includes positioning holes 120a and lenses 121.

The plurality of positioning holes 120a are provided in the optical connector 120 and position the optical connector 120 with respect to the connection target object 150 by positioning pins of the connection target object 150 being inserted therein. Further, the positioning holes 120a are also used for joining the optical waveguide sheet 110 with the optical connector 120.

The plurality of lenses 121 are provided in a surface on a side opposed to the connection target object 150. The plurality of lenses 121 are opposed to photoelectric conversion elements 151 of the connection target object 150. The plurality of lenses 121 are arranged in the X direction. The number of lenses 121 may be equal to the number of cores 112 or may be smaller than the number of cores 112. There is a possibility that the cores 112 positioned near the outer periphery of the base material 111 have an unstable shape. Therefore, several (e.g., five) cores 112 positioned near the outer periphery can be set to be dummies and the lenses 121 can be set not to be provided in the dummy cores 112. The lenses 121 are collimating lenses that collimate incident light, for example.

The plurality of photoelectric conversion elements 151 are arranged in the X direction as in the lenses 121. The photoelectric conversion elements 151 are respectively opposed to the lenses 121. The photoelectric conversion elements 151 can be light-emitting elements, light-receiving elements, or light-emitting and light-receiving elements. Note that the configuration of the connection target object 150 is not particularly limited. For example, the optical connector 120 can be connected to an optical function element that is installed on the organic substrate and emits or receives collimated light, an optical connector that is installed on the organic substrate and emits or receives collimated light, a photoelectric conversion element, an optical function element, or an optical connector that is installed on a weak base material like the organic substrate and emits or receives collimated light, or the like. Further, the optical connector 120 may be connected to another optical connector 120.

Mirror structures 140 are provided in the optical waveguide sheet 110. As will be described later, the mirror structure 140 is a structure having a concave shape provided in the optical waveguide sheet 110.

The protection sheet 130 is a sheet-like member made of synthetic resin and the like and bonded on the optical waveguide sheet 110. The protection sheet 130 coats the mirror structure 140, to thereby prevent dust and the like from entering the mirror structure 140 having a concave shape.

[Regarding Mirror Structure]

Figure 5:
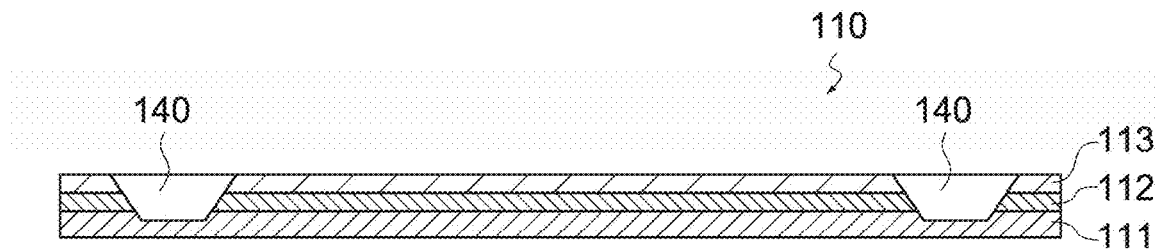
Figure 6:
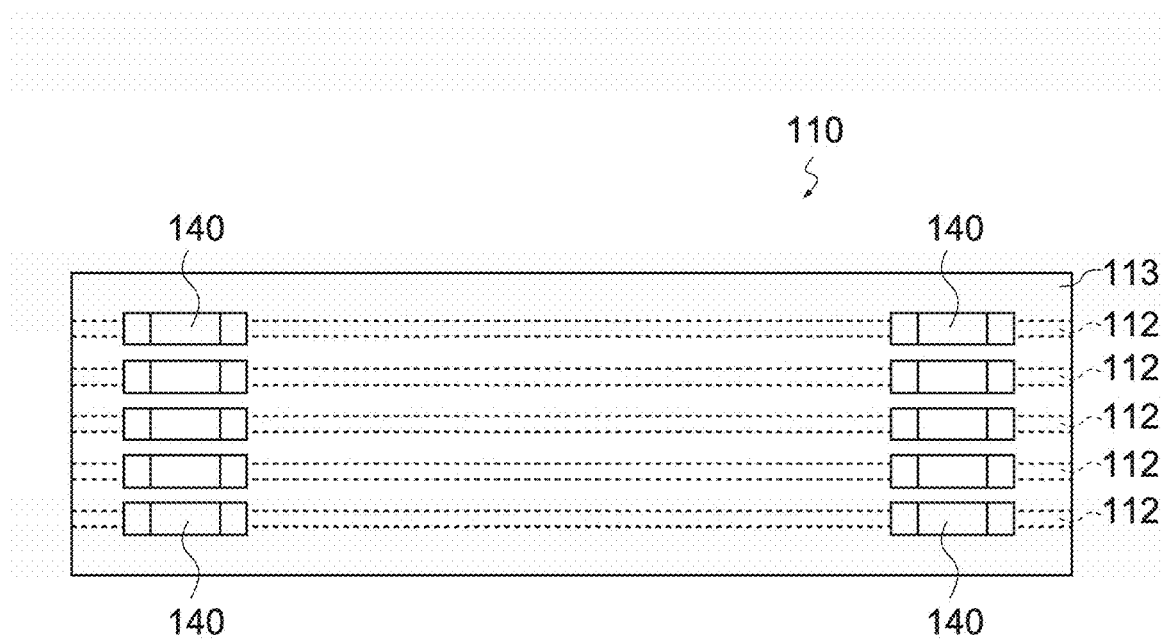

FIG. 5 is a cross-sectional view of the optical waveguide sheet 110 and is a view of the optical waveguide sheet 110 as viewed in the X direction. FIG. 6 is a plan view of the optical waveguide sheet 110 and is a view of the optical waveguide sheet 110 as viewed in the Y direction.

As shown in FIGS. 5 and 6, the mirror structure 140 is a structure having a concave shape provided in the optical waveguide sheet 110. One mirror structure 140 is provided at each of both end portions of one core 112. Further, only one mirror structure 140 may be provided in one core 112.

As shown in FIG. 2, each mirror structure 140 is provided at a position opposed to the lens 121 provided in the optical connector 120 in the Y direction.

Figure 7:
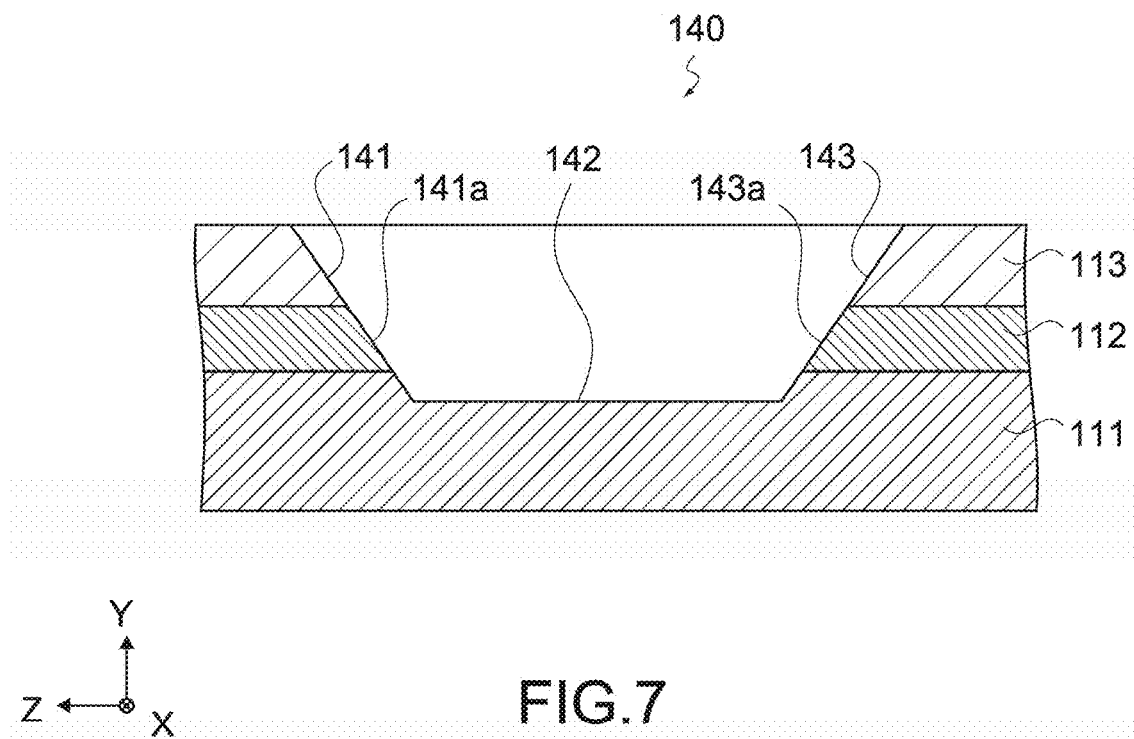
Figure 8:
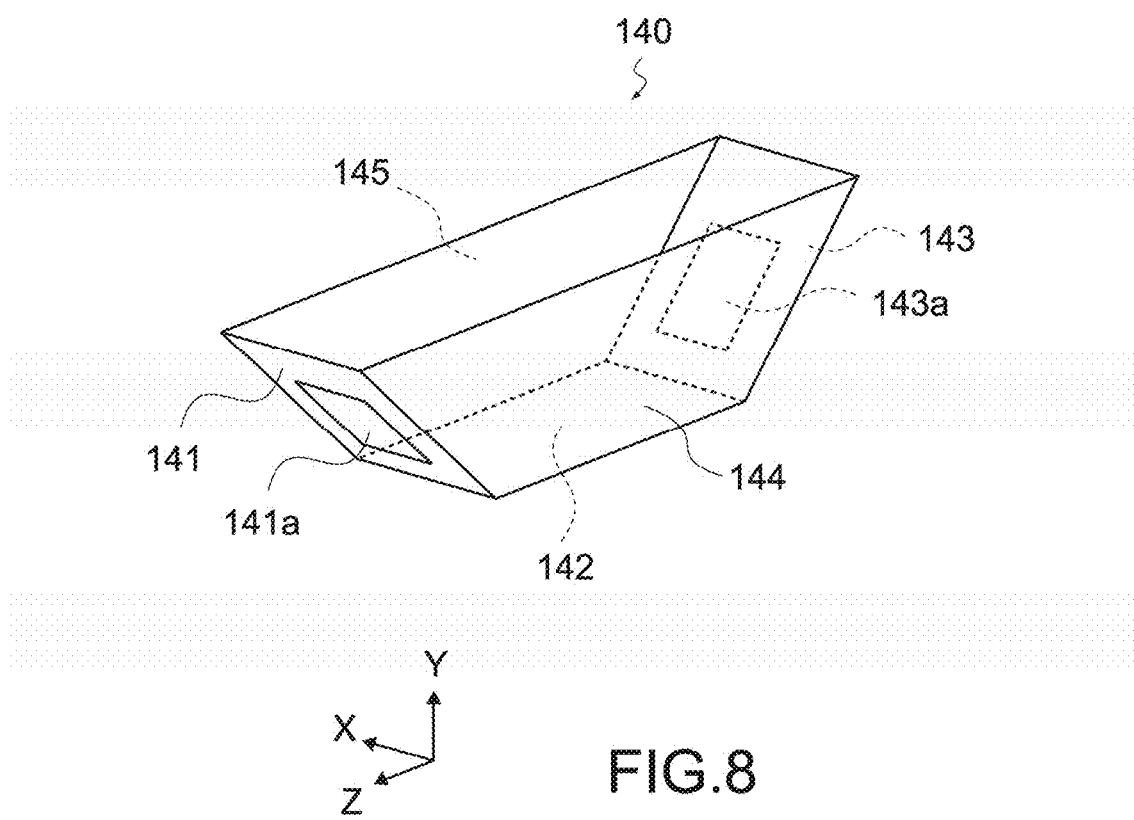
Figure 9:
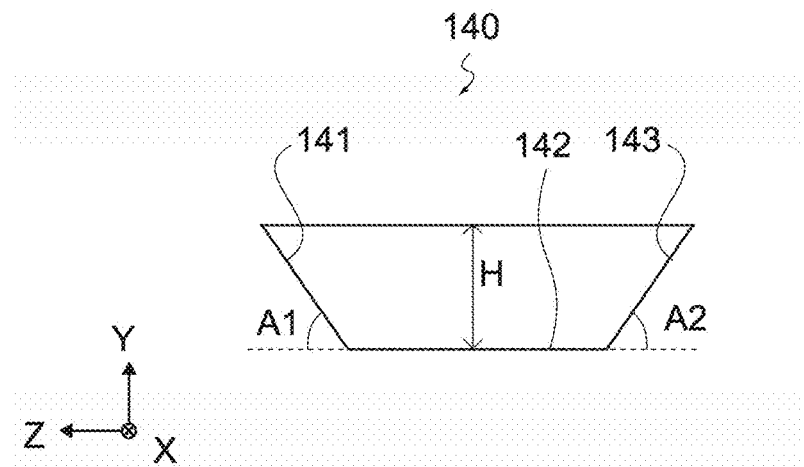
Figure 10:
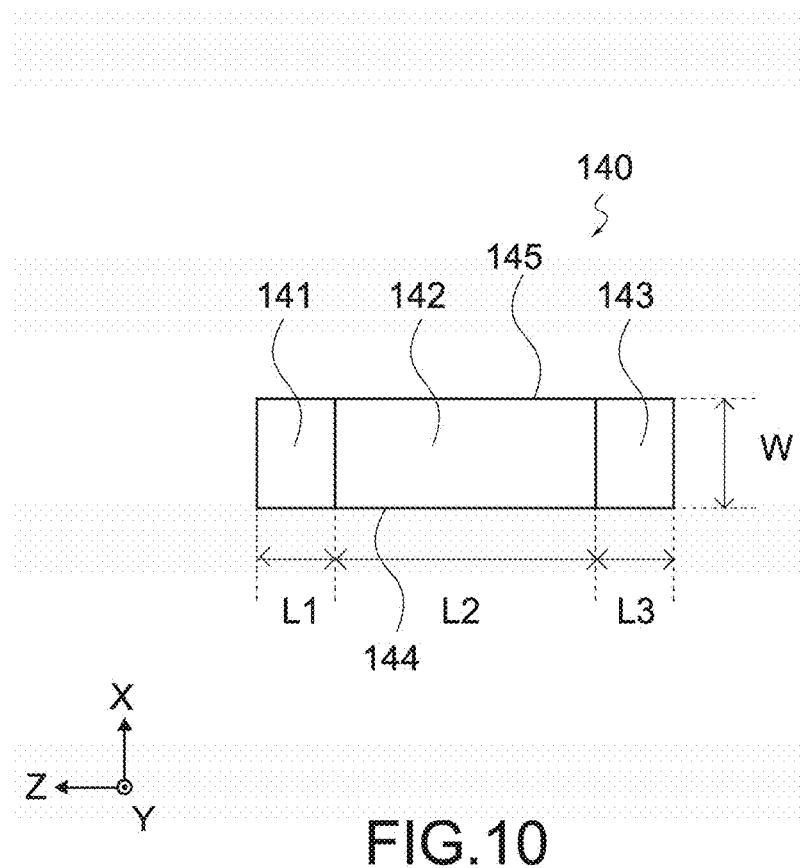

FIG. 7 is a cross-sectional view of the mirror structure 140 and is a view of the mirror structure 140 as viewed in the X direction. FIG. 8 is a perspective view of the mirror structure 140. FIG. 9 is a schematic view of the mirror structure 140 as viewed in the X direction. FIG. 10 is a schematic view of the mirror structure 140 as viewed in the Y direction.

As shown in FIG. 7, the mirror structure 140 is formed by removing parts of the cladding 113, the core 112, and the base material 111 from the optical waveguide sheet 110. As shown in FIGS. 7 and 8, the mirror structure 140 includes an inclined surface 141, a bottom surface 142, an inclined surface 143, a side surface 144, and a side surface 145.

The inclined surface 141 is a surface parallel to the X direction and inclined with respect to the X-Z plane. As shown in FIG. 9, an angle A1 formed by the inclined surface 141 and the X-Z plane can be 45°, for example. The mirror structure 140 is provided to block the core 112. As shown in FIG. 8, the inclined surface 143 includes a core region 141a that is a region in which the core 112 is exposed in the inclined surface 141.

The bottom surface 142 is a surface continuous with the inclined surface 141 and the inclined surface 143 and parallel to the X-Z plane.

The inclined surface 143 is a surface parallel to the X direction and inclined with respect to the X-Z plane and is a surface symmetric to the inclined surface 141 with respect to the X-Y plane. As shown in FIG. 9, an angle A2 formed by the inclined surface 143 and the X-Y plane can be 45°, for example. As shown in FIG. 8, the inclined surface 143 includes a core region 143a that is a region in which the core 112 is exposed in the inclined surface 143.

The side surface 144 is a surface parallel to the Y-Z plane. As shown in FIGS. 7 and 8, the side surface 144 has a trapezoidal shape. A shorter base of the trapezoid corresponds to one side of the bottom surface 142 and a longer base of the trapezoid corresponds to a top surface of the cladding 113.

The side surface 145 is a surface parallel to the Y-Z plane. As shown in FIGS. 8 and 9, the side surface 145 has a trapezoidal shape identical to the shape of the side surface 144. A shorter base of the trapezoid corresponds to one side of the bottom surface 142 and a longer base of the trapezoid corresponds to the top surface of the cladding 113.

The side surface 144 and the side surface 145 are spaced apart from each other in the X direction. Connection between the side surface 144 and the side surface 145 is achieved by the inclined surface 141, the bottom surface 142, and the inclined surface 143. The mirror structure 140 has an inner space. Due to a refractive index difference between the core 112 and the air, the core region 141a and the core region 143a function as total reflection mirrors.

Although the size of the mirror structure 140 is not limited, a depth H can be 60 μm, for example, a length L1 of the inclined surface 141 in the Z direction can be 60 μm, for example, a length L2 of the bottom surface 142 in the Z direction can be 200 μm, for example, a length L3 of the inclined surface 143 in the Z direction can be 60 μm, for example, and a width W of the mirror structure 140 in the X direction can be 100 μm, for example, as shown in FIGS. 9 and 10.

[Operation of Optical Waveguide Sheet]

Figure 11:
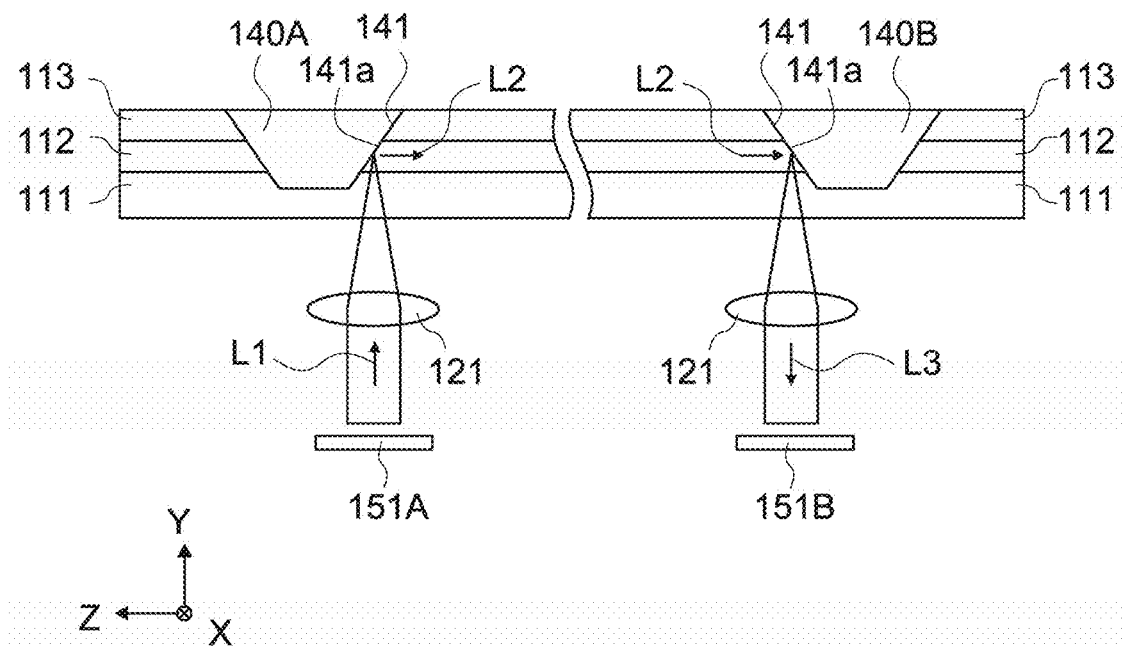

An operation of the optical transmission module 100 will be described. FIG. 11 is a schematic view showing the operation of the optical transmission module 100. As shown in the figure, the optical waveguide sheet 110 transmits light between a photoelectric conversion element 151A and a photoelectric conversion element 151B. The photoelectric conversion element 151A and the photoelectric conversion element 151B are the photoelectric conversion elements 151 provided in the connection target object 150 in such a manner that the photoelectric conversion element 151A and the photoelectric conversion element 151B are spaced apart from each other. It is assumed that the photoelectric conversion element 151A is a light-emitting element and the photoelectric conversion element 151B is a light-receiving element.

The mirror structure 140 of the mirror structures 140, which is opposed to the photoelectric conversion element 151A in the Y direction, will be referred to as a mirror structure 140A and the mirror structure 140 of the mirror structures 140, which is opposed to the photoelectric conversion element 151B in the Y direction, will be referred to as a mirror structure 140B.

Light L1 emitted from the photoelectric conversion element 151A is concentrated by the lens 121 and enters the core region 141a of the inclined surface 141 of the mirror structure 140A in the Y direction.

As described above, the core region 141a is the total reflection mirror, and thus the incident light is reflected by the core region 141a in the Z direction and travels through the core 112. The light traveling through the core 112 is shown as light L2. The light L2 enters the core region 141a of the inclined surface 141 of the mirror structure 140B and is reflected in the Y direction. The reflected light is shown as light L3.

The light L3 enters the photoelectric conversion element 151B via the lens 121 and is photoelectrically converted. Further, the photoelectric conversion element 151B may be a light-emitting element. In this case, light is transmitted from the photoelectric conversion element 151B to the photoelectric conversion element 151A in an inverse route of the above-mentioned route.

[Regarding Arrangement of Mirror Structures]

Although the mirror structures 140 can be provided in such a manner that the mirror structures 140 are opposed to each other in the X direction as shown in FIG. 6, the mirror structures 140 are not limited thereto.

Figure 12:
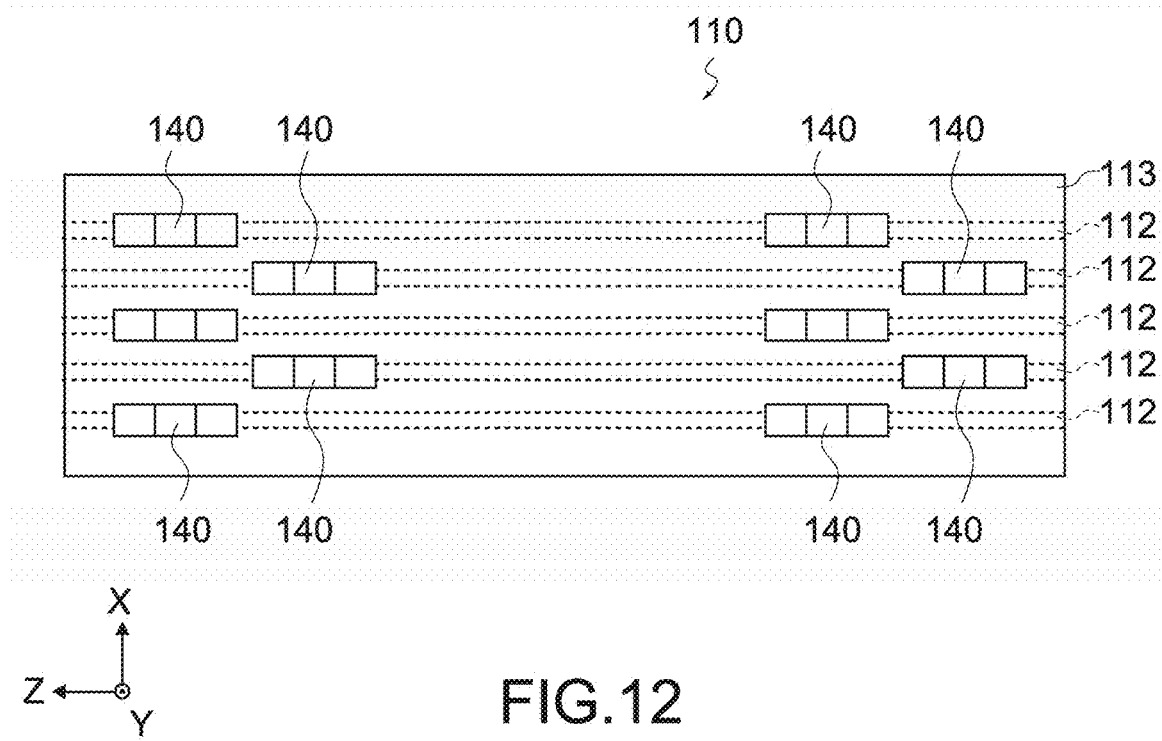
Figure 13:
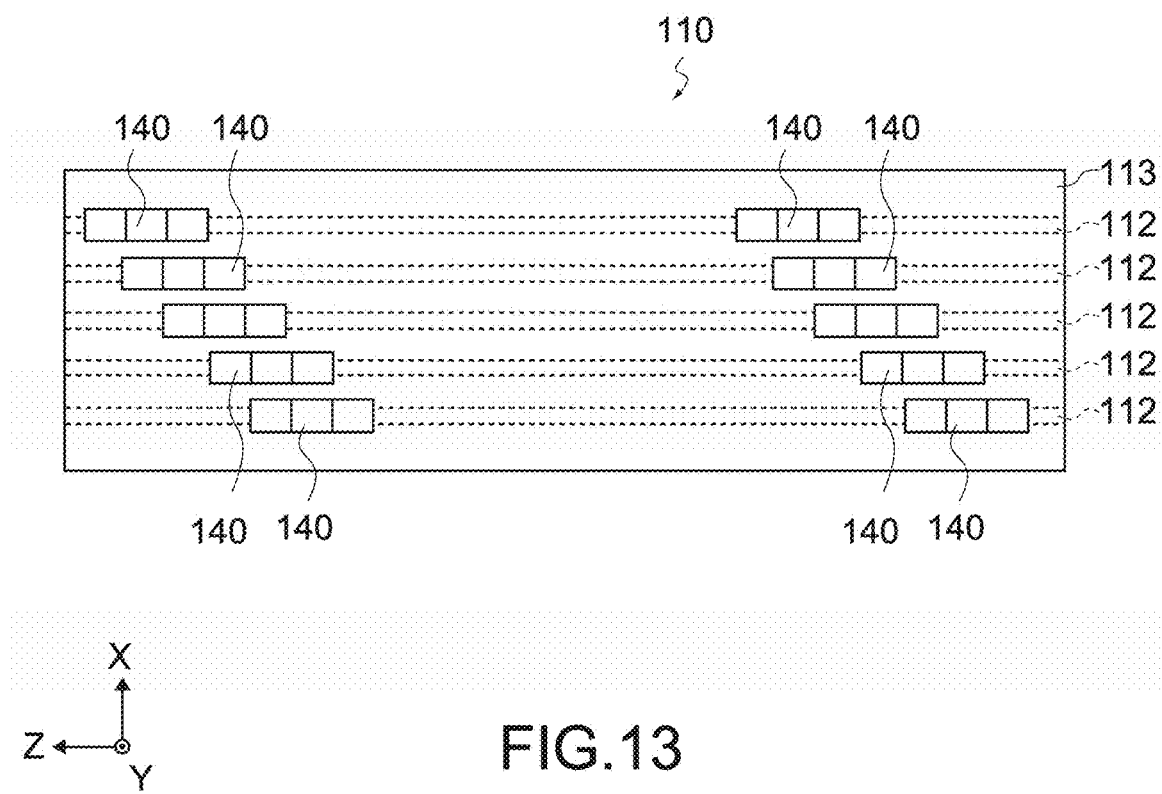

FIGS. 12 and 13 are schematic views showing other arrangements of the mirror structures 140. As shown in these figures, the mirror structures 140 may be provided at different positions in the Z direction between the adjacent mirror structures 140. As shown in FIG. 2, each of the mirror structures 140 is opposed to the lens 121 and the photoelectric conversion element 151 in the Y direction.

As will be described later, the mirror structures 140 according to this embodiment can be provided at arbitrary positions on the cores 112. Other than the arrangement in which each pair of mirror structures 140 is arranged in line in the X direction as shown in FIG. 6, the arrangements as shown in FIGS. 12 and 13 are possible. That is, the mirror structures 140 can be provided at arbitrary positions in a manner that depends on the arrangement of the photoelectric conversion elements 151.

[Manufacturing Method for Optical Waveguide Sheet]

Figure 14:
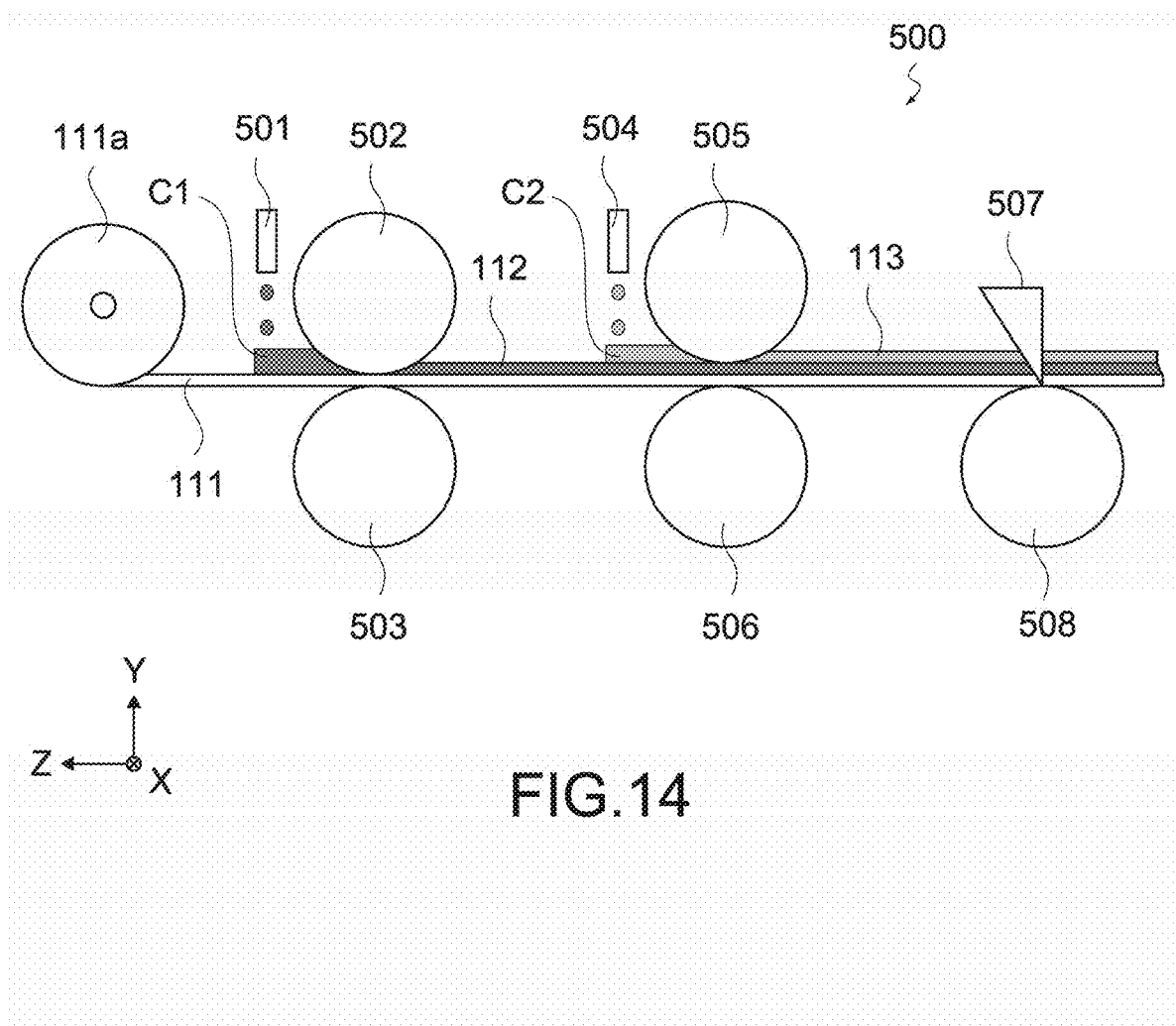

A manufacturing method for the optical waveguide sheet 110 will be described. FIG. 14 is a schematic view showing the manufacturing method for the optical waveguide sheet 110 and FIGS. 15 to 18 are schematic views of respective manufacturing processes of the optical waveguide sheet 110. As shown in FIG. 14, the optical waveguide sheet 110 can be manufactured by a roll imprint method using a roll imprint apparatus 500.

Figure 15:
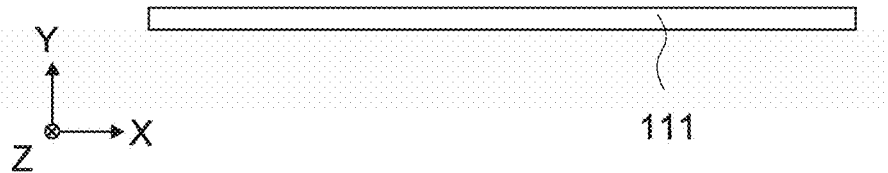

As shown in FIG. 14, the base material 111 around which a base material roll 111a is wound is set in the roll imprint apparatus 500 and the base material 111 is conveyed from the base material roll 111a. Although the base material 111 can be conveyed in a roll-to-roll process, it may be conveyed by another method. FIG. 15 is a schematic view of the base material 111 pulled out of the base material roll 111a. The base material 111 has a thickness (in Y direction) of 100 µm, for example, and a width (in X direction) of 300 mm, for example.

Figure 19:
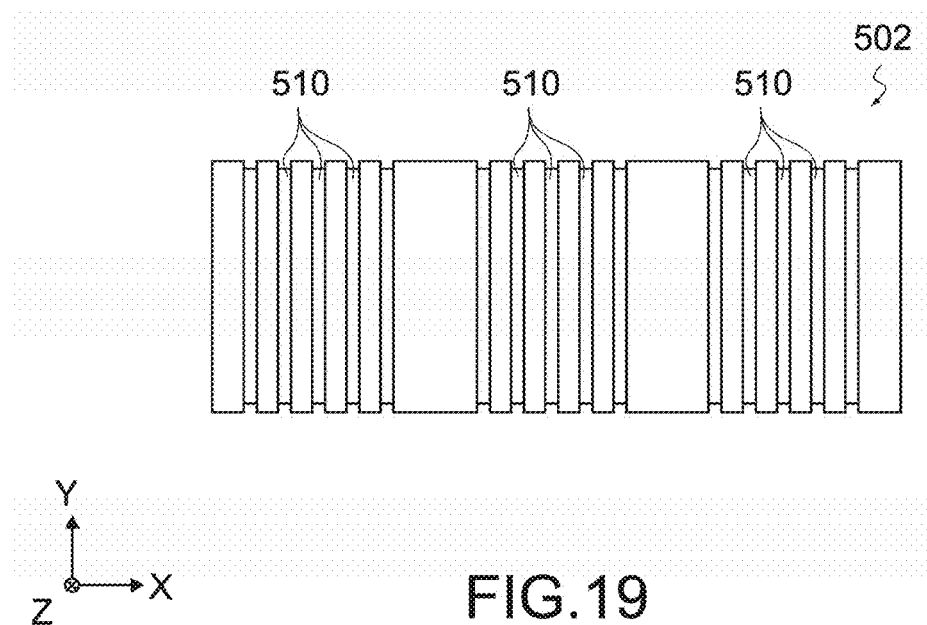

Subsequently, a core material C1 is dispensed onto the base material 111 from a core material dispensing section 501 and the core material C1 is applied onto the base material 111. The core material C1 can be ultraviolet curable resin. The core material C1 passes through a gap between a cylindrical transfer roll 502 and an elastic roll 503 together with the base material 111. FIG. 19 is a schematic view of the cylindrical transfer roll 502.

The cylindrical transfer roll 502 is a roll made of metal and the like and has a width (in X direction) of 300 mm, for example, and a diameter of 150 mm, for example. As shown in the figure, a plurality of grooves 510 are formed in the cylindrical transfer roll 502 in a circumferential direction. The number of grooves 510 is actually twenty, for example. The elastic roll 503 is a roll made of an elastic material such as a rubber.

The base material 111 and the core material C1 pass through the gap between the cylindrical transfer roll 502 and the elastic roll 503 and are pressed by the cylindrical transfer roll 502 and the elastic roll 503. By passing through the grooves 510, the shapes of the grooves 510 are transferred to the core material C1 and the core material C1 is formed into the shapes of the cores 112. The core material C1 is irradiated with ultraviolet rays at the same time or immediately after the core material C1 passes through the gap between the cylindrical transfer roll 502 and the elastic roll 503. Thus, the core material C1 is cured and the cores 112 are formed.

Figure 16:
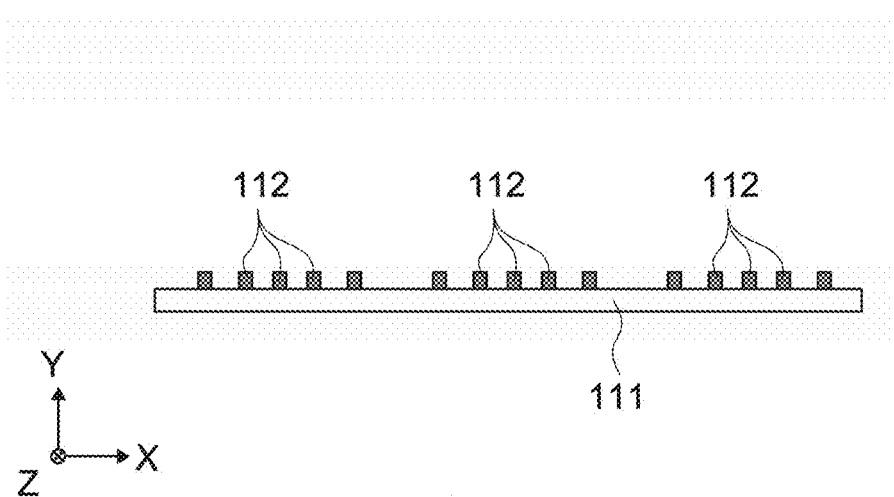

FIG. 16 is a schematic view of the base material 111 and the cores 112 after the base material 111 and the cores 112 pass through the gap between the cylindrical transfer roll 502 and the elastic roll 503. The core 112 can have a width (in X direction) and a height (in Y direction) of 50 µm. The intervals (in X direction) of the cores 112 can be 125 µm, for example.

Subsequently, a cladding material C2 is dispensed onto the base material 111 and the cores 112 from a core material dispensing section 504 and the cladding material C2 is applied onto the base material 111 and the cores 112. The cladding material C2 can be ultraviolet curable resin. The cladding material C2 passes through a gap between a press roll 505 and an elastic roll 506 together with the base material 111 and the cores 112. The press roll 505 is a roll made of metal and the like and the elastic roll 506 is a roll made of an elastic material such as a rubber.

The base material 111, the core 112, and the cladding material C2 are pressed by the press roll 505 and the elastic roll 506. The cladding material C2 is made to have a predetermined thickness by pressing or due to a set clearance between the rolls and is formed in the shape of the cladding 113. The cladding material C2 is irradiated with ultraviolet rays at the same time or immediately after the cladding material C2 passes through the gap between the press roll 505 and the elastic roll 506. Thus, the cladding material C2 is cured and the cladding 113 is formed.

Figure 17:
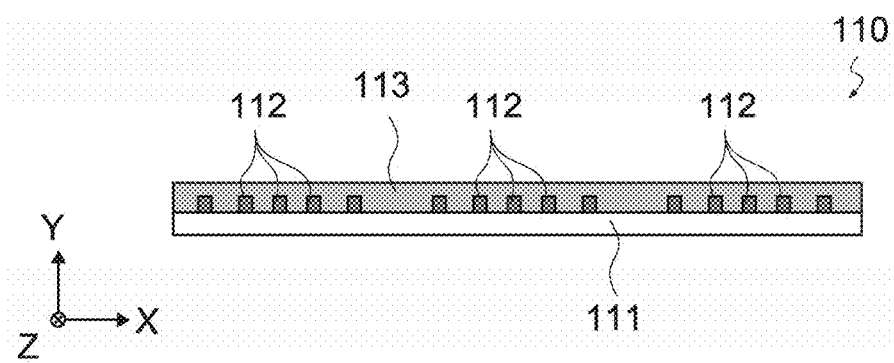

FIG. 17 is a schematic view of the base material 111, the core 112, and the cladding 113 after the base material 111, the core 112, and the cladding 113 pass through the gap between the press roll 505 and the elastic roll 506. The cladding 113 can have a thickness (in Y direction) of 100 µm, for example, from the base material 111.

Figure 18:
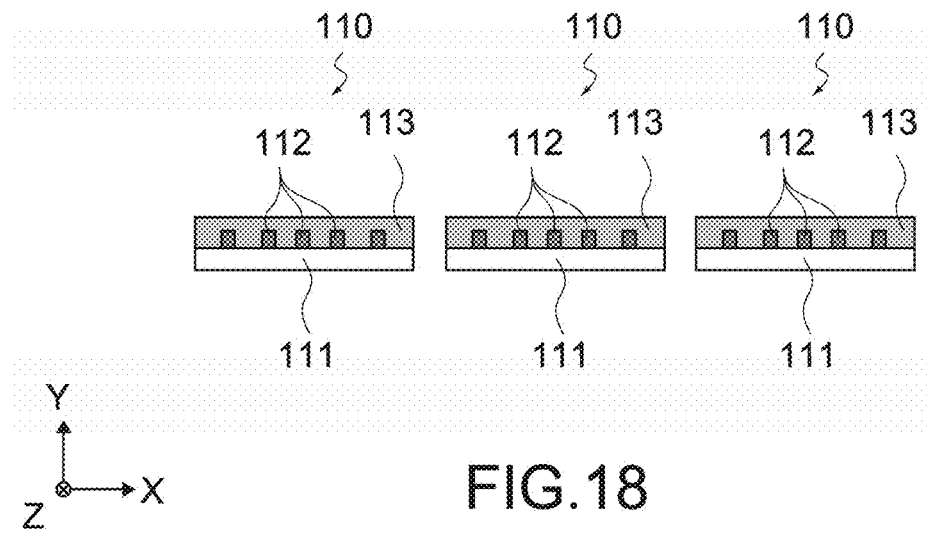

Subsequently, the base material 111, the core 112, and the cladding 113 are cut by a cutting mechanism, which is formed by a blade 507 and a roll 508, in the extending direction (Z direction) of the cores 112. Thus, a plurality of optical waveguide sheets 110 are formed. FIG. 18 is a schematic view of the plurality of optical waveguide sheets 110 formed by cutting. Note that, although FIGS. 15 to 18 show manufacturing processes of three optical waveguide sheets 110, a larger number of optical waveguide sheets 110 can be actually manufactured by the identical processes, and, for example, 30 optical waveguide sheets 110 can be manufactured at the same time.

Note that this manufacturing method is an example of the manufacturing method for the optical waveguide sheet 110 and the optical waveguide sheet 110 can also be manufactured by using a method other than the roll imprint method. On the other hand, the roll imprint method is relatively low in manufacture cost and apparatus cost, and the optical waveguide sheet 110 can be manufactured at low cost.

[Formation Method for Mirror Structure]

Figure 20:
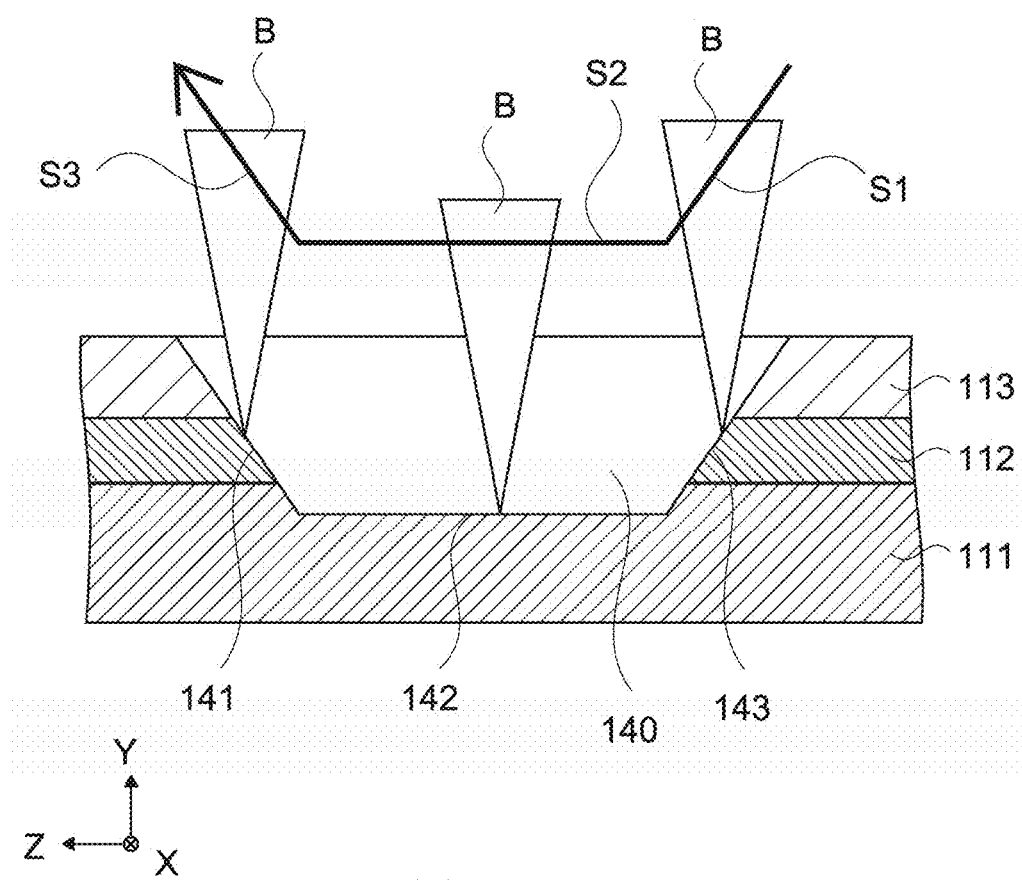

FIG. 20 is a schematic view showing a formation method for the mirror structure 140. As shown in the figure, the mirror structure 140 can be formed by moving a cutting tool B in routes of a route S1, a route S2, and a route S3 and performing cutting on the optical waveguide sheet 110.

The route S1 is a route extending in a direction parallel to the X direction and inclined with respect to the X-Z plane and the angle of inclination with respect to the X-Z plane is 45°, for example. The route S2 is a route extending in a direction parallel to the X-Z plane. The route S3 is a route extending in a direction parallel to the X direction, inclined with respect to the X-Z plane, and inclined in a direction opposite to the route S1 with respect to the X-Y plane and the angle of inclination with respect to the X-Z plane is 45°, for example.

By cutting the optical waveguide sheet 110 while continuously moving the cutting tool B in the route S1, the route S2, and the route S3, the mirror structure 140 as shown in FIG. 7 is formed. Specifically, the inclined surface 143 is formed through the route S1 and the bottom surface 142 is formed through the route S2. Further, the inclined surface 141 is formed through the route S1.

Figure 21:
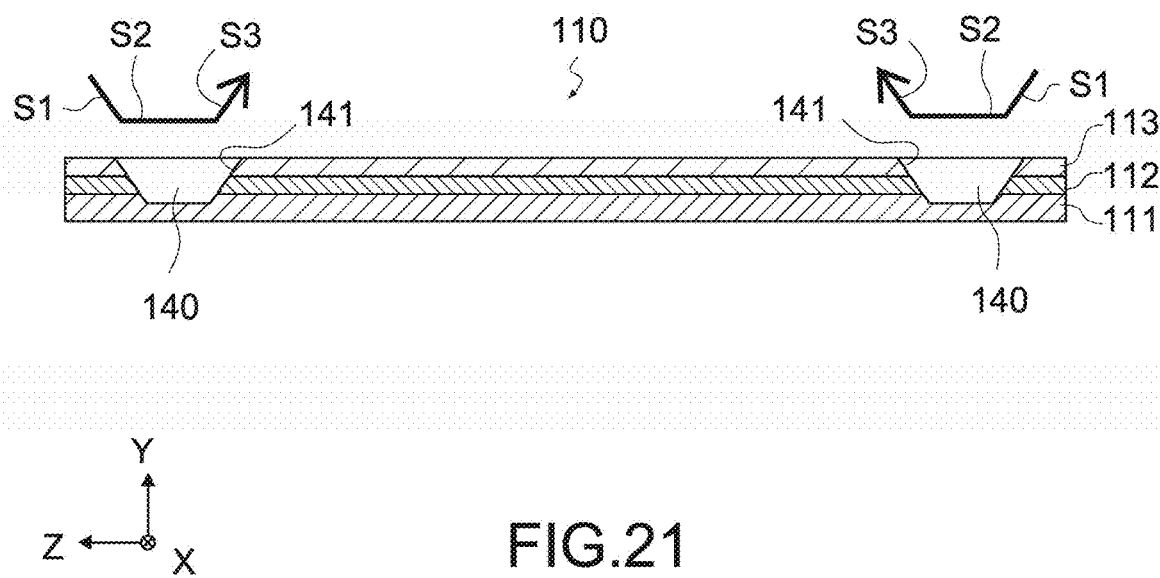

FIG. 21 is a schematic view showing directions of routes in forming the two mirror structures 140 in the optical waveguide sheet 110. As shown in the figure, the routes are provided such that the routes S1 are outside in the Z direction and the routes S3 are inside in the Z direction. Thus, the two mirror structures 140 are disposed such that the inclined surfaces 141 are opposed to each other. Note that these routes may be opposite to the directions shown in the figure.

By performing cutting in such a manner that the cutting tool passes through the route S1, the route S2, and the route S3 continuously, the inclined surface 141, the bottom surface 142, and the inclined surface 143 can be made to be smooth surfaces. If the inclined surface 141 is not a smooth surface, loss components of light due to diffused reflection on the inclined surface 141 are caused. By performing cutting as described above, it is possible to reduce such loss components.

[Manufacturing Method for Optical Transmission Module]

A manufacturing method for the optical transmission module 100 will be described. FIGS. 22 to 35 are schematic views showing the manufacturing method for the optical transmission module 100.

Figure 22:
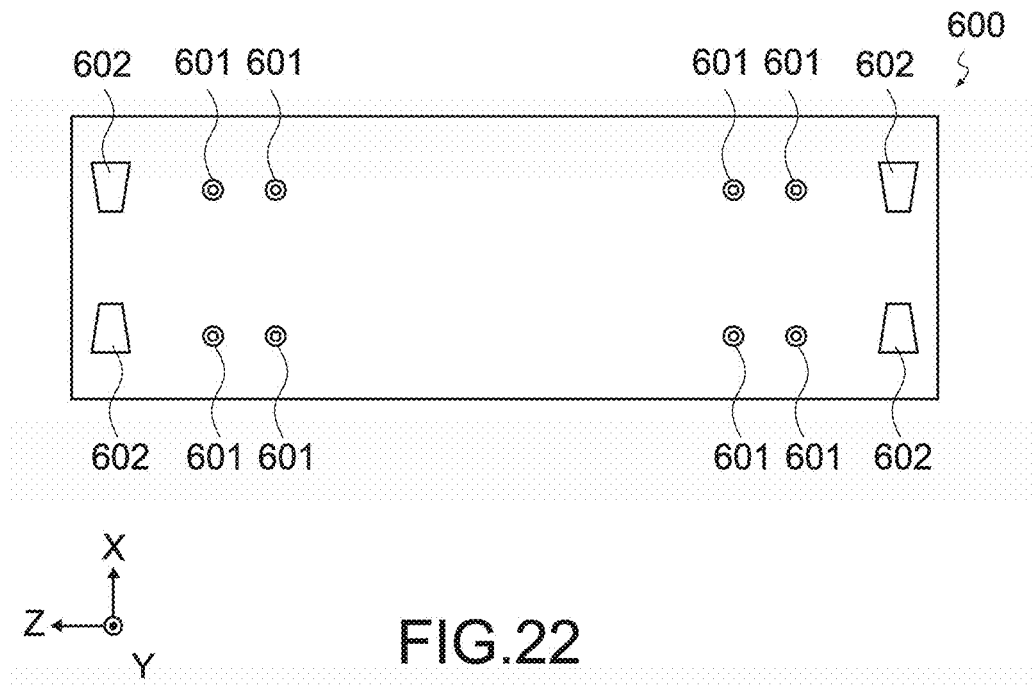
Figure 23:
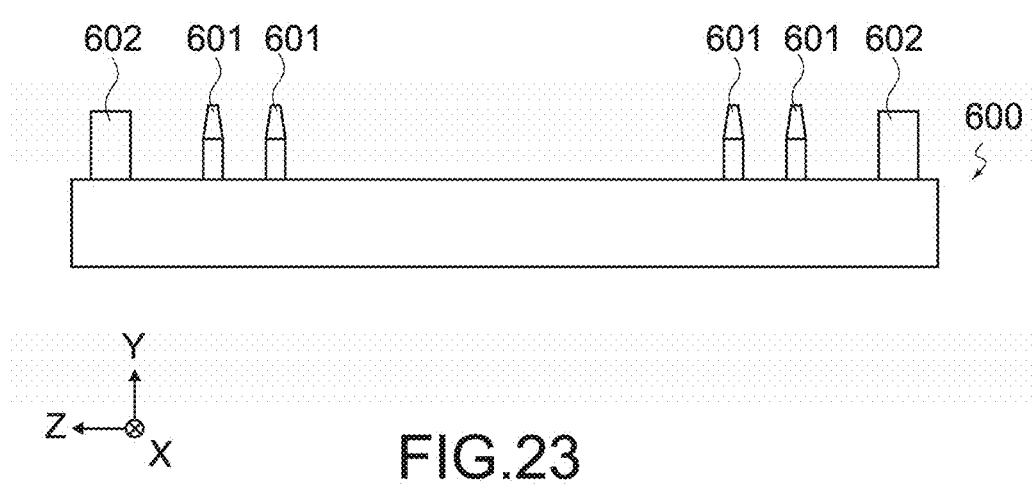

FIGS. 22 and 23 are plan views of a jig 600 used for manufacturing the optical transmission module 100. As shown in the figure, the jig 600 includes positioning pins 601 and optical waveguide sheet supporting portions 602.

Figure 24:
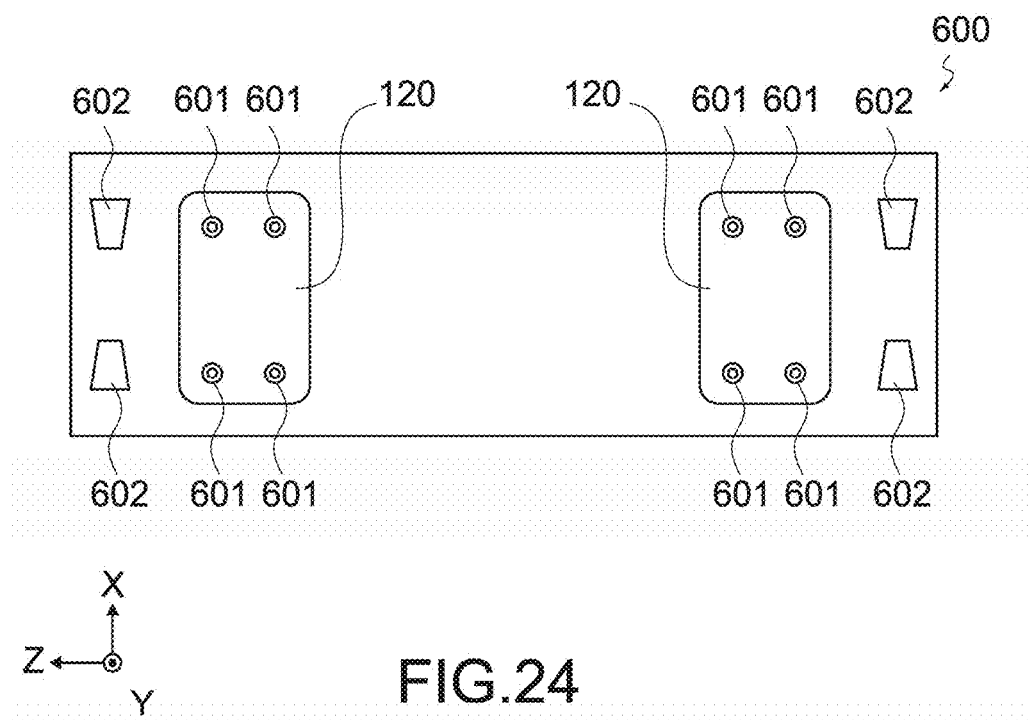
Figure 25:
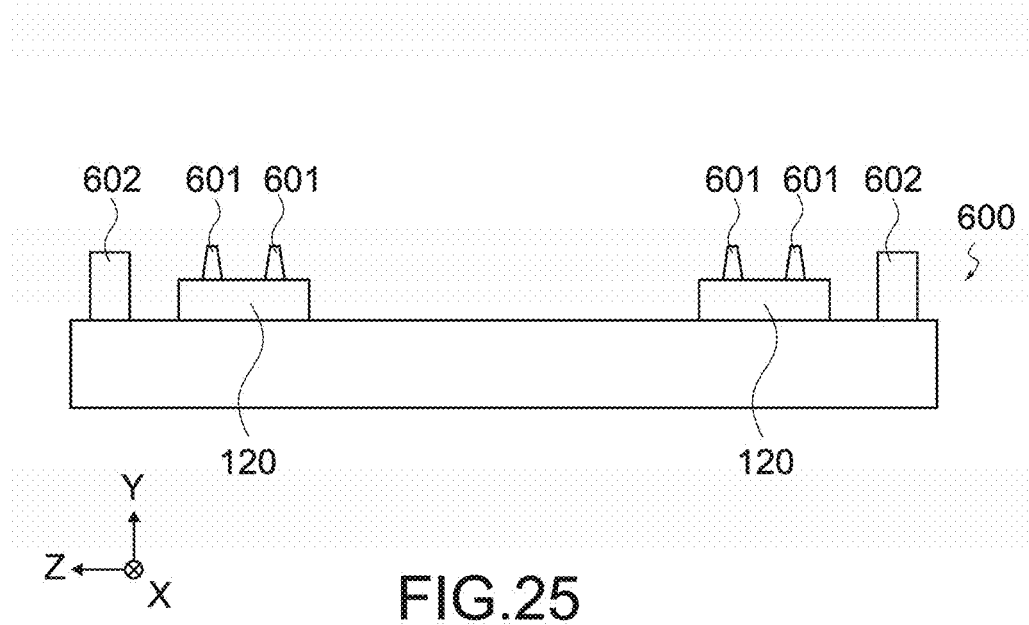

As shown in FIGS. 24 and 25, two optical connectors 120 are disposed on the jig 600. By inserting the positioning pins 601 into the positioning holes 120a, the optical connectors 120 can be positioned to the jig 600.

Figure 26:
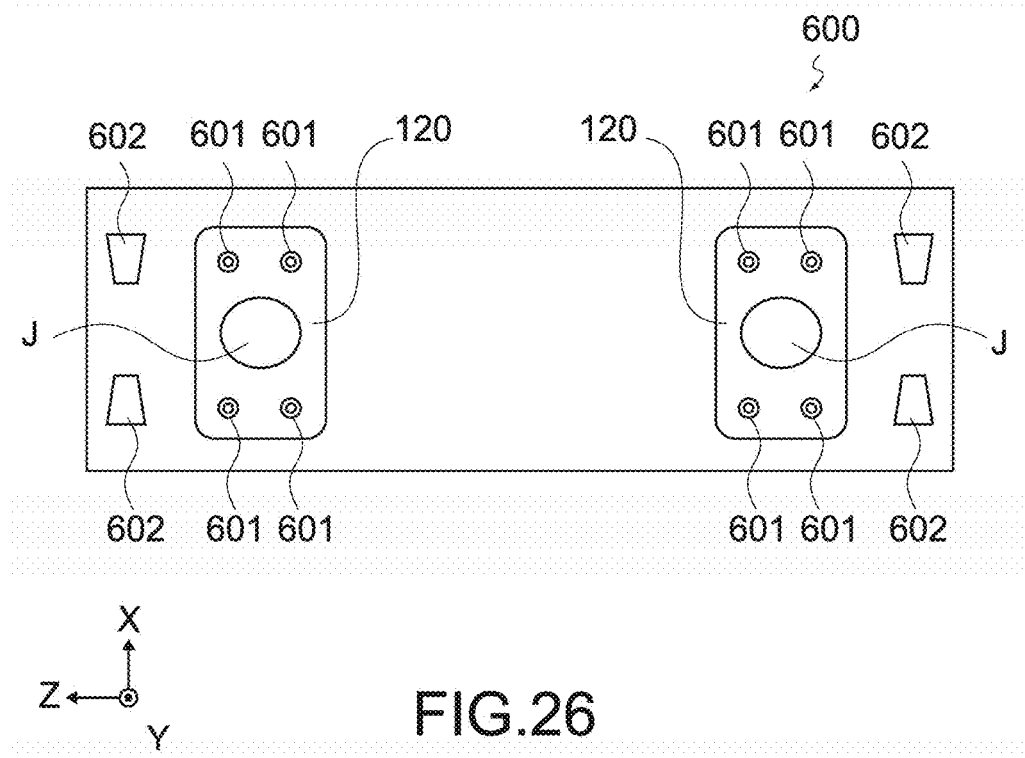
Figure 27:
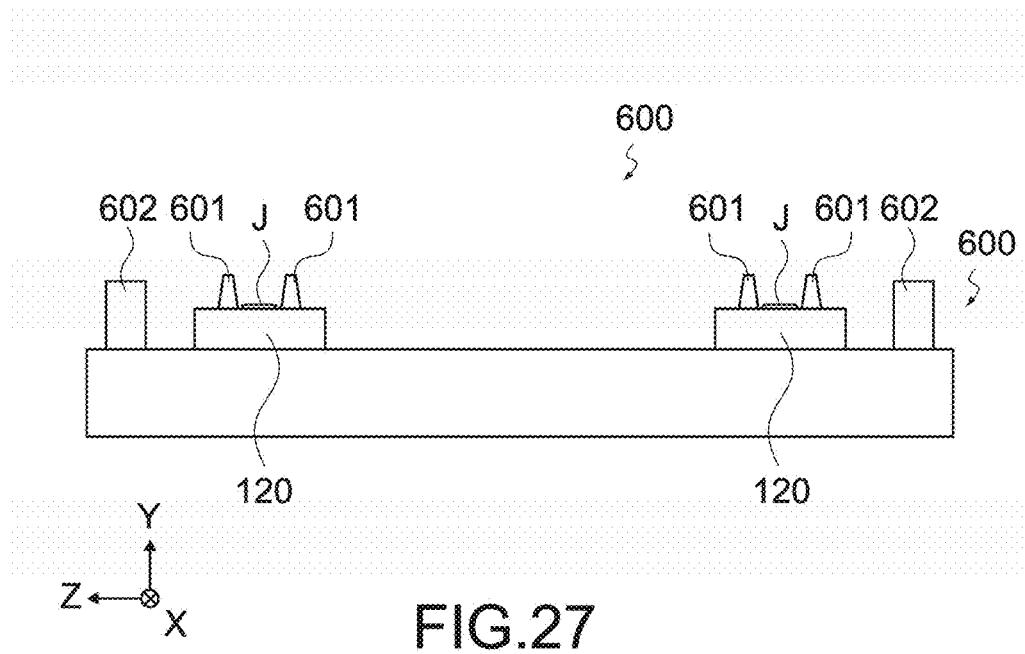

Subsequently, as shown in FIGS. 26 and 27, an adhesive J is dropped onto the optical connectors 120. The adhesive J is ultraviolet curable resin, for example.

Figure 28:
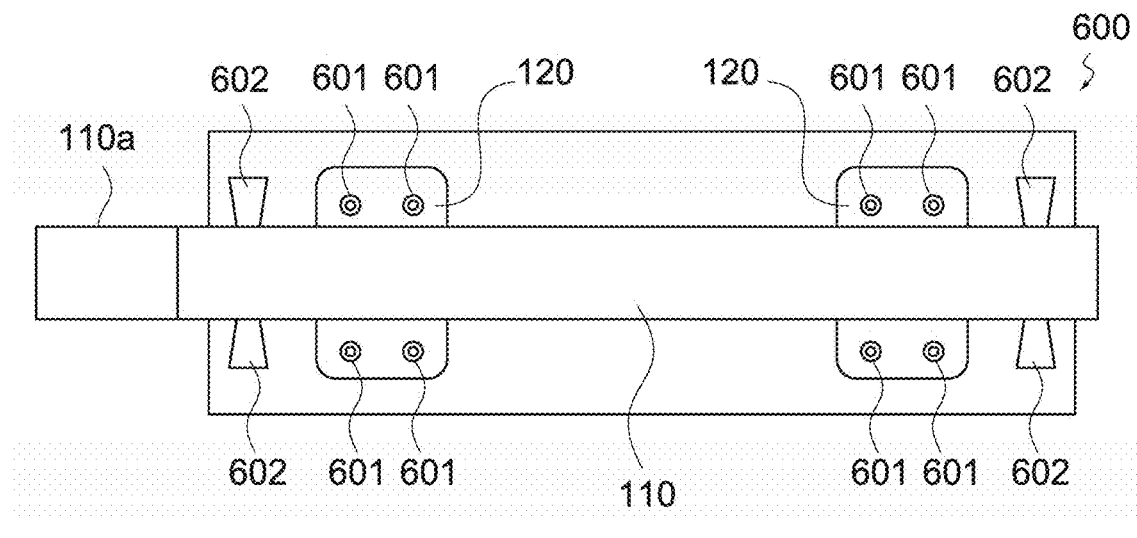
Figure 29:
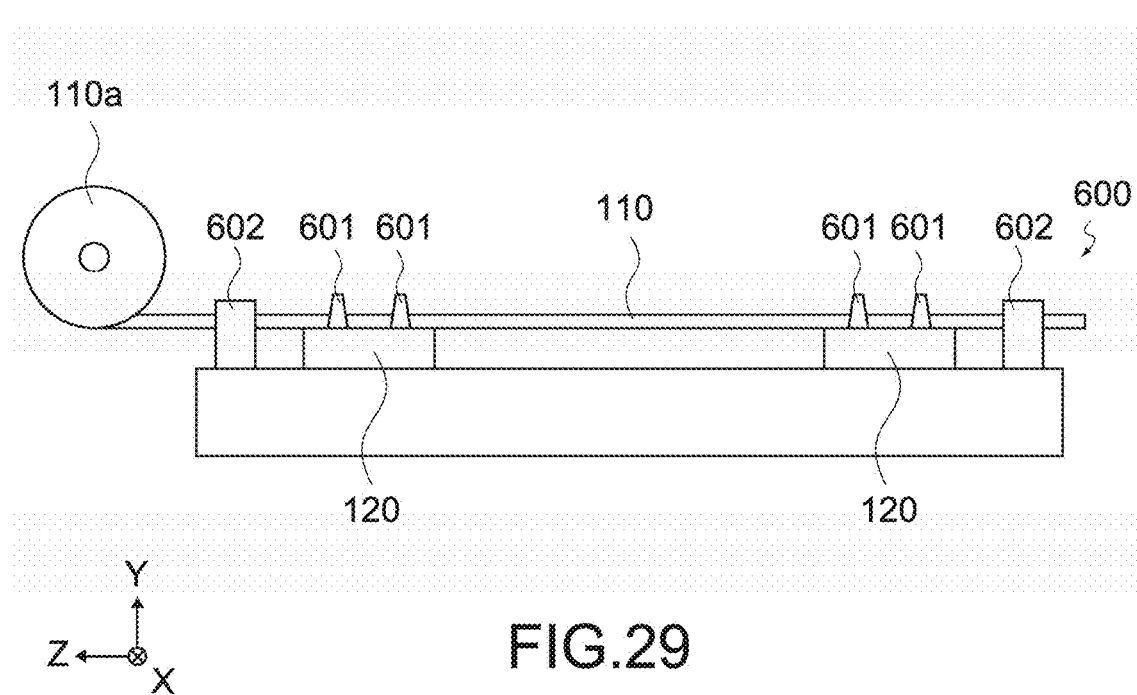

Subsequently, as shown in FIGS. 28 and 29, the optical waveguide sheet 110 is pulled out of an optical waveguide sheet roll 110a, around which the optical waveguide sheet 110 is wound, onto the optical connectors 120 and the adhesive J is cured. The adhesive J can be cured by being irradiated with ultraviolet rays. The optical waveguide sheet 110 can be positioned in the X direction by using the optical waveguide sheet supporting portions 602.

Figure 30:
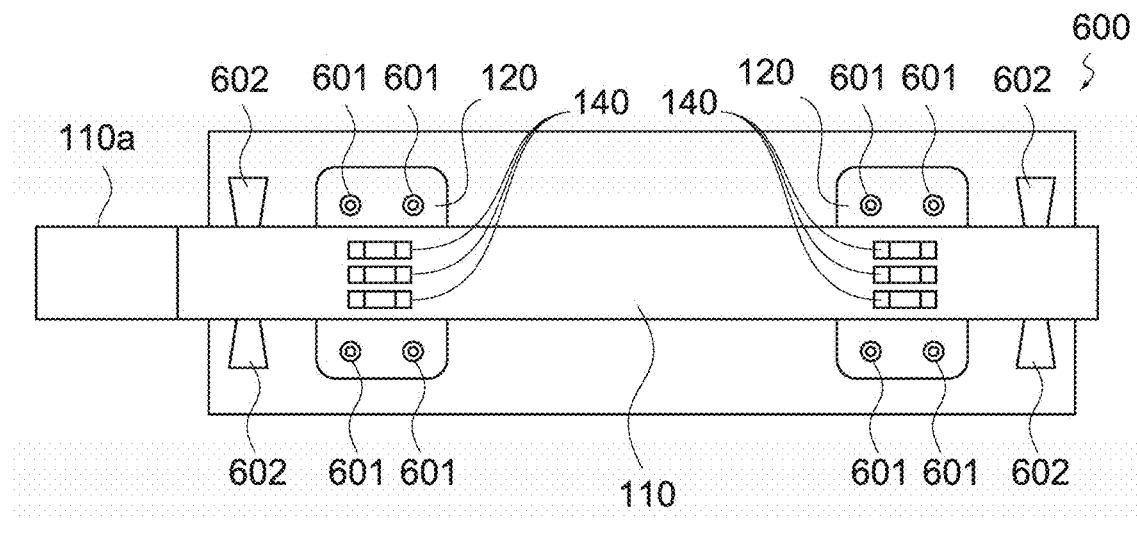
Figure 31:
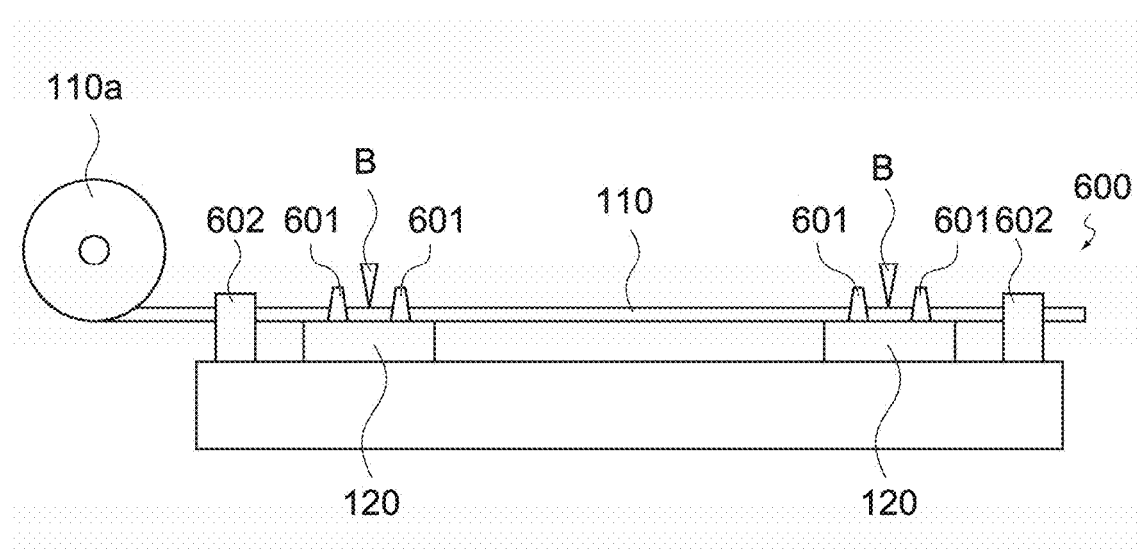

Subsequently, as shown in FIG. 31, by cutting the optical waveguide sheet 110 while moving the cutting tool B in the above-mentioned routes, the mirror structures 140 are formed as shown in FIG. 30. At this time, by arranging a plurality of cutting tools B in the X direction, the plurality of mirror structures 140 can be formed at once. Alternatively, the respective mirror structures 140 may be individually formed.

Figure 32:
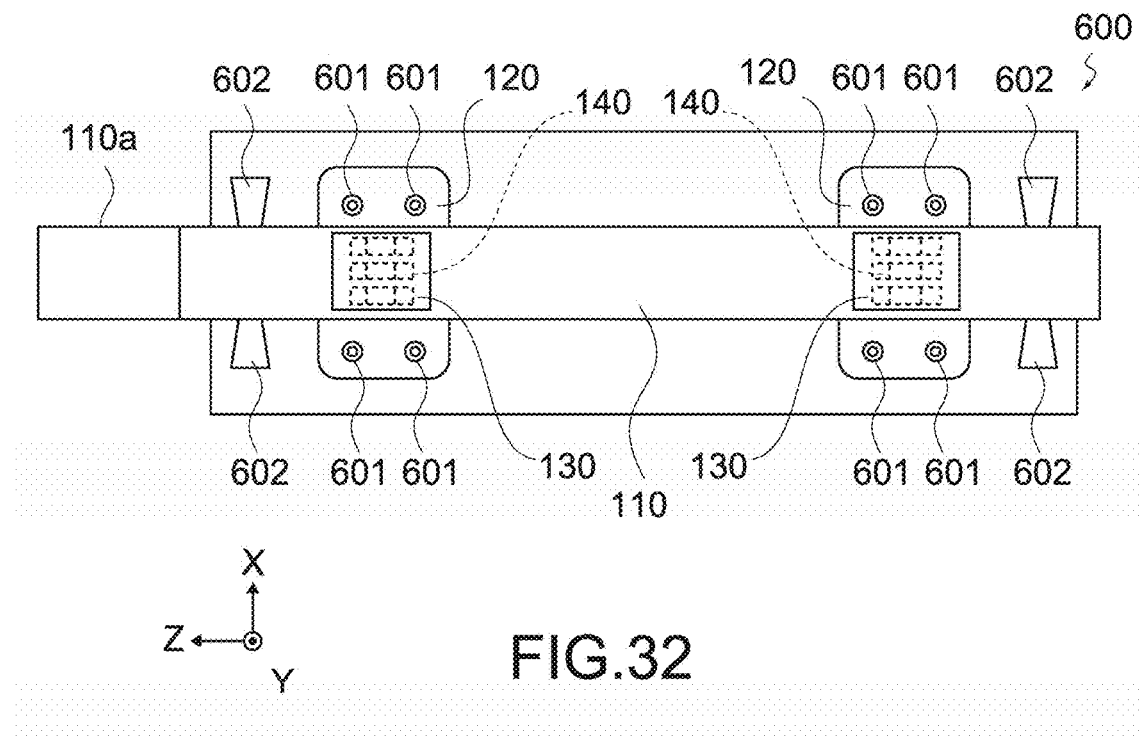
Figure 33:
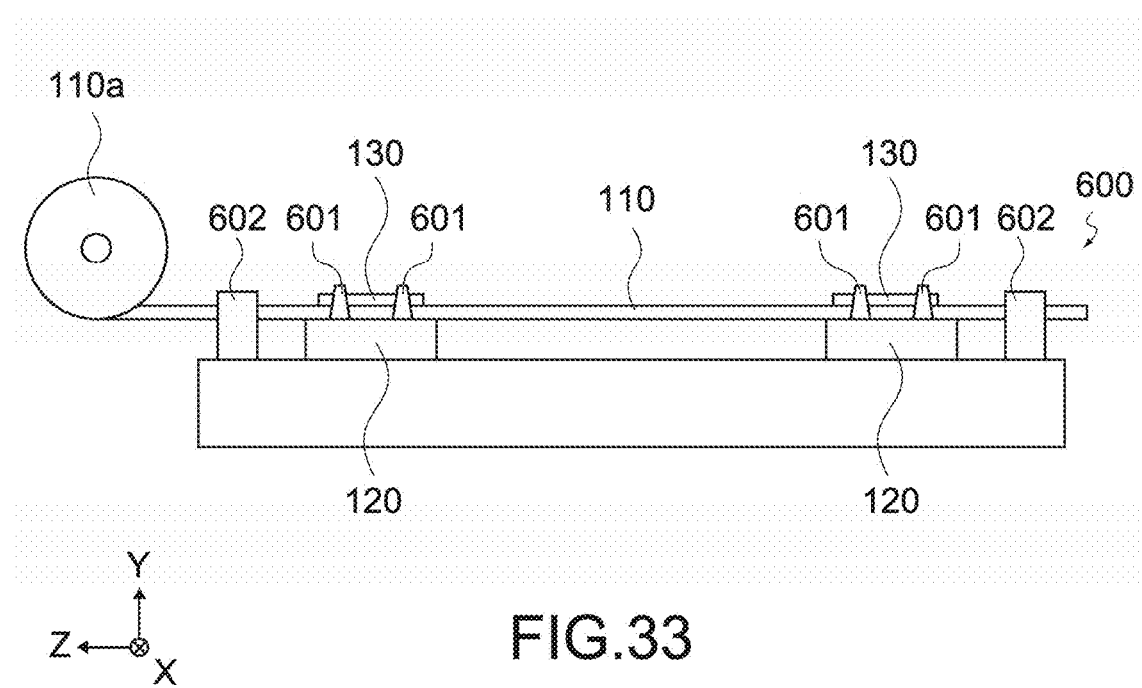

Subsequently, as shown in FIGS. 32 and 33, the protection sheets 130 are bonded on the mirror structures 140. The plurality of mirror structures 140 may be coated with a single protection sheet 130 or each of the mirror structures 140 may be coated with an individual protection sheet 130.

Figure 34:
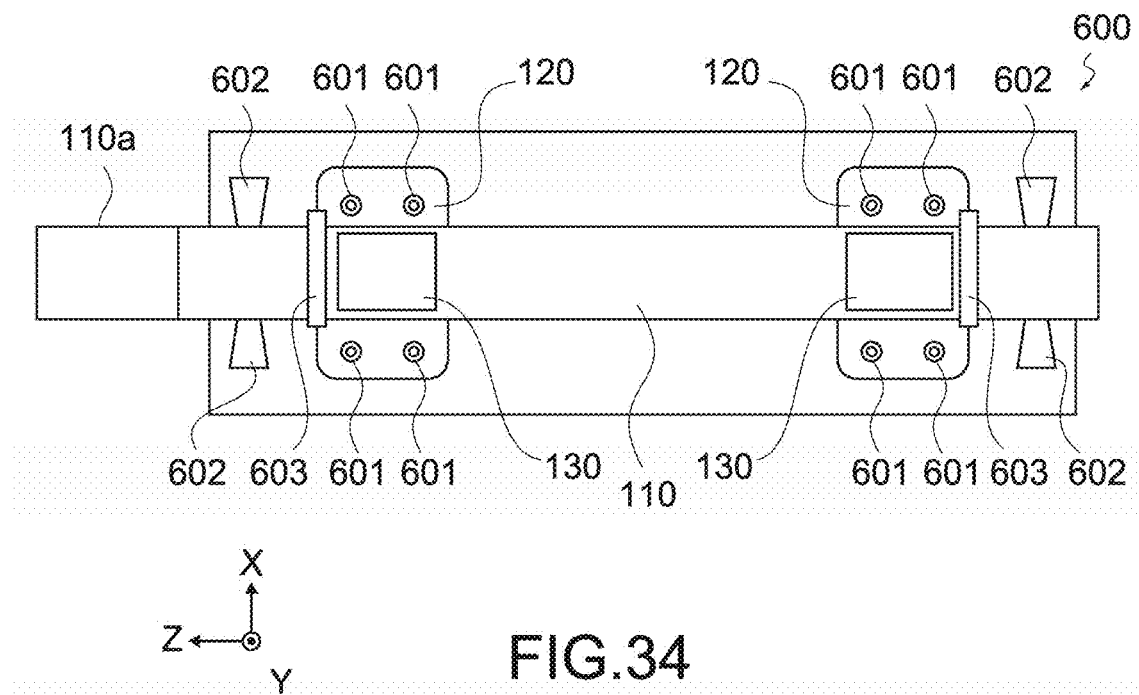
Figure 35:
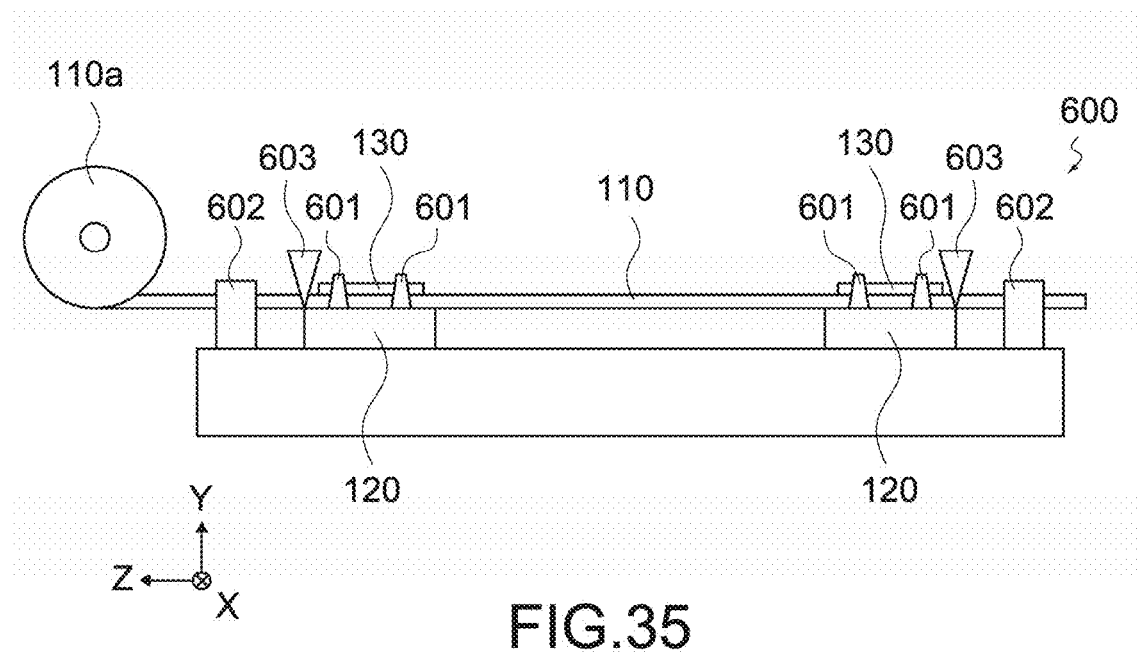

Subsequently, as shown in FIGS. 34 and 35, an unnecessary part of the optical waveguide sheet 110 is cut off by a blade 603. The optical transmission module 100 can be manufactured in the above-mentioned manner.

MODIFIED EXAMPLES

Figure 36:
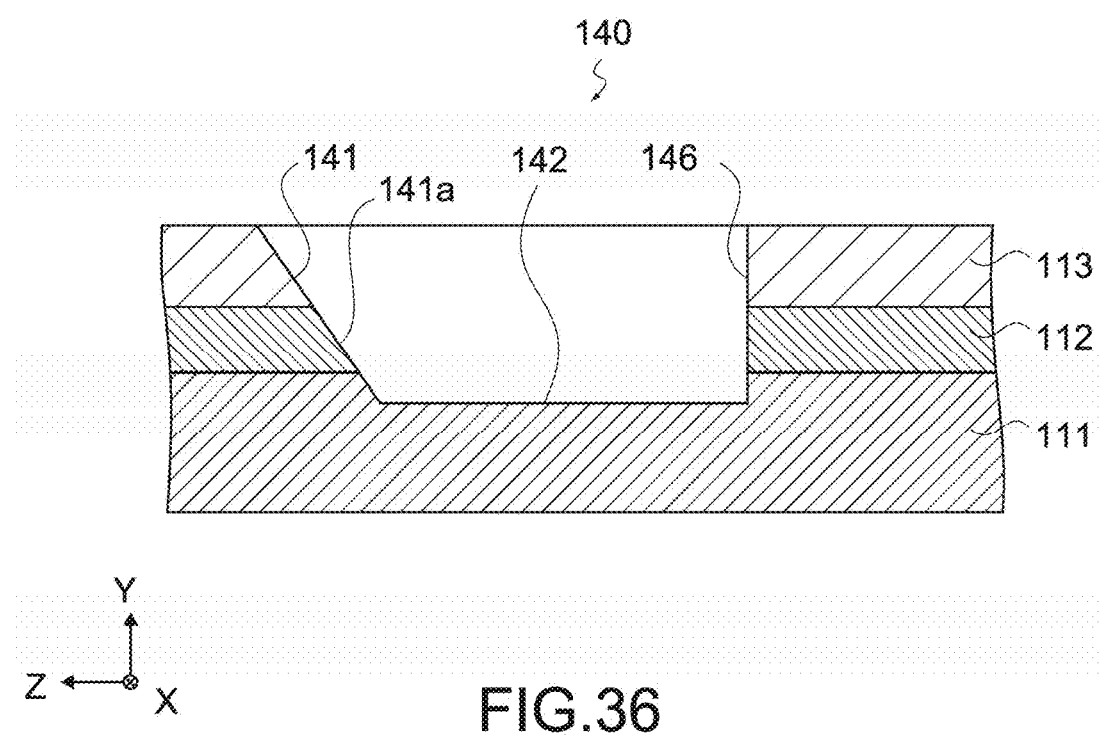

Although the mirror structure 140 includes the inclined surface 141, the bottom surface 142, and the inclined surface 143 in the above-mentioned embodiment, the mirror structure 140 only needs to include at least the inclined surface 141 and the bottom surface 142. FIG. 36 is a cross-sectional view of a mirror structure 140 according to a modified example as viewed in the X direction.

As shown in the figure, the mirror structure 140 may include a perpendicular surface 146 instead of the inclined surface 143. The perpendicular surface 146 is a surface parallel to the X direction and perpendicular to the X-Z plane. The inclined surface 143 is not involved with light reflection between the core 112, and thus it does not necessarily need to be a surface inclined with respect to the X-Z plane. Otherwise, the inclined surface 143 may be a curved surface or a stepped structure.

Figure 37:
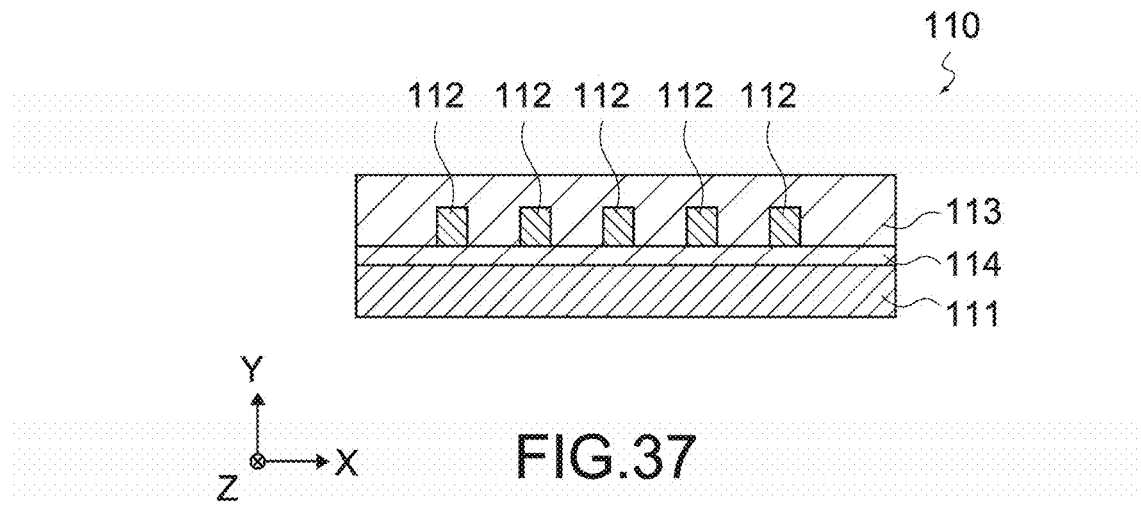

Further, although the cores 112 are formed on the base material 111 (see FIG. 3) in the above-mentioned embodiment, it is not limited thereto. FIG. 37 is a cross-sectional view of an optical waveguide sheet 110 according to a modified example. As shown in the figure, the optical waveguide sheet 110 may include a lower cladding layer 114 in addition to the base material 111, the cores 112, and the cladding 113.

The lower cladding layer 114 can be formed on the base material 111 and the core 112 and the cladding 113 can be formed on the lower cladding layer 114. The lower cladding layer 114 is made of ultraviolet curable resin and the like having a refractive index equivalent to that of the cladding 113. In this case, the base material 111 does not function as the cladding, and thus the material can be selected irrespective of the refractive index.

In the manufacturing processes (see FIG. 14) of the optical waveguide sheet 110, it is only necessary to apply and cure the cladding material to the base material 111 before the core material C1 is applied onto the base material 111. Thus, the lower cladding layer 114 is formed on the base material 111. By applying the core material C1 onto the lower cladding layer 114, the cores 112 can be formed.

Figure 38:
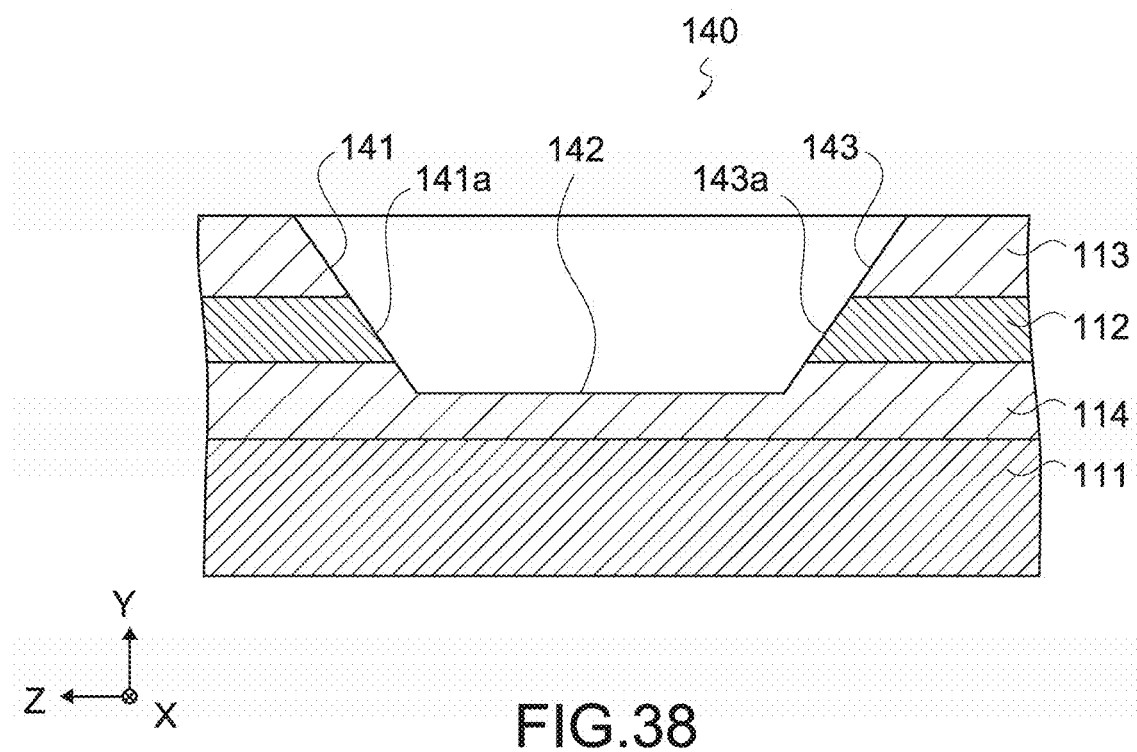

FIG. 38 is a cross-sectional view of a mirror structure 140 formed in the optical waveguide sheet 110 including the lower cladding layer 114 as viewed in the X direction. As shown in the figure, the bottom surface 142 may be provided in the lower cladding layer 114. Further, the bottom surface 142 may be provided in the base material 111 by cutting it more deeply.

It should be noted that the present technology may also take the following configurations.

(1)

An optical waveguide sheet, including:

a core extending in a first direction parallel to a first plane;

a cladding provided around the core; and a mirror structure having a concave shape which is formed from the cladding to the core, the mirror structure including
- a first inclined surface that is parallel to a second direction perpendicular to the first direction and parallel to the first plane, is inclined with respect to the first plane, and includes a core region in which the core is exposed, and
- a bottom surface parallel to the first plane.

(2)

The optical waveguide sheet according to (1), in which the mirror structure further includes a second inclined surface symmetric to the first inclined surface with respect to a plane perpendicular to the first direction.

(3)

The optical waveguide sheet according to (1) or (2), in which the mirror structure includes
- a first side surface that is parallel to the first direction, is perpendicular to the first plane, and has a trapezoidal shape, and
- a second side surface that is parallel to the first direction, is perpendicular to the first plane, is opposed to the first side surface in the second direction, and has a trapezoidal shape.

(4)

The optical waveguide sheet according to (1) or (3), in which the core includes a plurality of cores arranged in the second direction, and the mirror structure includes a plurality of mirror structures including the first inclined surfaces each including each of core regions in which the plurality of cores are exposed.

(5)

The optical waveguide sheet according to (4), in which the plurality of mirror structures are at different positions in the first direction between adjacent mirror structures.

(6)

The optical waveguide sheet according to any one of (1) to (5), further including a sheet-like base material, in which the core is formed on the base material, and the cladding is formed on the base material and the core.

(7)

The optical waveguide sheet according to any one of (1) to (5), further including a sheet-like base material, in which the cladding includes a first cladding formed on the base material and a second cladding formed on the first cladding and the core.

(8)

An optical transmission module, including:

an optical waveguide sheet including
- a core extending in a first direction parallel to a first plane,
- a cladding provided around the core, and
- a first mirror structure having a concave shape which is formed from the cladding to the core, the first mirror structure including
  - a first inclined surface that is parallel to a second direction perpendicular to the first direction and parallel to the first plane, is inclined with respect to the first plane, and includes a core region in which the core is exposed, and
  - a first bottom surface parallel to the first plane, and
- a second mirror structure having a concave shape which is formed from the cladding to the core, the second mirror structure including
  - a third inclined surface that is parallel to the second direction, is inclined with respect to the first plane, and includes a core region in which the core is exposed, and
  - a second bottom surface parallel to the first plane;

a first optical connector that causes light to enter the first inclined surface; and a second optical connector that light emitted from the third inclined surface enters.

(9)

A manufacturing method for an optical waveguide sheet, including:

preparing an optical waveguide sheet member including a core extending in a first direction parallel to a first plane and a cladding provided around the core; and forming a first inclined surface including a core region in which the core is exposed by cutting the optical waveguide sheet member along a first route that is parallel to a second direction perpendicular to the first direction and parallel to the first plane and is inclined with respect to the first plane, and forming a bottom surface parallel to the first plane by cutting the optical waveguide sheet member along a second route continuous with the first route and parallel to the first plane.

(10)

The manufacturing method for an optical waveguide sheet according to (9), in which the step of forming the first inclined surface and the bottom surface further includes forming a second inclined surface including a core region in which the core is exposed by cutting the optical waveguide sheet member along a third route which is continuous with the second route, is inclined with respect to the first plane, and is symmetric to the first route with respect to a plane perpendicular to the first direction.

(11)

The manufacturing method for an optical waveguide sheet according to (9) or (10), in which the step of preparing the optical waveguide sheet member includes applying a core material onto a sheet member, transferring a shape of a groove to the core material by rotating a cylindrical transfer roll having a cylindrical surface in which the groove is formed while pressing the cylindrical transfer roll against the core material, forming a core by curing the core material, applying a cladding material onto the sheet member and the core, and forming a cladding by curing the cladding material.

(12)

The manufacturing method for an optical waveguide sheet according to any one of (9) to (11), in which the sheet member is a base material, and the step of applying the core material onto the sheet member includes applying the core material onto the base material.

(13)

The manufacturing method for an optical waveguide sheet according to any one of (9) to (11), in which
the sheet member includes a base material and a lower cladding layer stacked on the base material, and
the step of applying the core material onto the sheet member includes applying the core material onto the lower cladding layer.

REFERENCE SIGNS LIST 100 optical transmission module
110 optical waveguide sheet
111 base material
112 core
113 cladding
114 lower cladding layer
120 optical connector
130 protection sheet
140 mirror structure
141 inclined surface
142 bottom surface
143 inclined surface
144 side surface
145 side surface

The invention claimed is:

1. An optical waveguide sheet, comprising:
a sheet-like base material;
a core on the sheet-like base material, wherein the core extends in a first direction parallel to a first plane;
a cladding around the core; and
a mirror structure that extends from the cladding to the sheet-like base material, wherein
the mirror structure has a concave shape, and
the mirror structure comprises:
a first inclined surface parallel to a second direction, wherein
the second direction is perpendicular to the first direction and parallel to the first plane,
the first inclined surface is inclined with respect to the first plane,
the first inclined surface includes a core region, and
the core region exposes the core; and
a bottom surface parallel to the first plane.

2. The optical waveguide sheet according to claim 1, wherein the mirror structure further comprises a second inclined surface symmetric to the first inclined surface with respect to a second plane perpendicular to the first direction.

3. The optical waveguide sheet according to claim 2, wherein the mirror structure further comprises:
a first side surface parallel to the first direction and perpendicular to the first plane, wherein the first side surface has a trapezoidal shape; and
a second side surface parallel to the first direction, perpendicular to the first plane, and opposite to the first side surface in the second direction, wherein the second side surface has the trapezoidal shape.

4. The optical waveguide sheet according to claim 1, wherein
the core includes a plurality of cores in the second direction,
the mirror structure further comprises a plurality of mirror structures including a plurality of inclined surfaces, each of the plurality of inclined surfaces comprises a corresponding one of a plurality of core regions, and
each of the plurality of core regions exposes a corresponding one of the plurality of cores.

5. The optical waveguide sheet according to claim 4, wherein the plurality of mirror structures are at different positions in the first direction between adjacent mirror structures of the plurality of mirror structures.

6. The optical waveguide sheet according to claim 1, wherein
the cladding is on the sheet-like base material and the core.

7. The optical waveguide sheet according to claim 1, wherein the cladding includes:
a first cladding on the sheet-like base material; and
a second cladding on the first cladding and the core.

8. An optical transmission module, comprising:
an optical waveguide sheet including;
a core extending in a first direction parallel to a first plane;
a cladding provided around the core;
a first mirror structure having a concave shape which is formed from the cladding to the core, the first mirror structure including:
a first inclined surface that is parallel to a second direction perpendicular to the first direction and parallel to the first plane, is inclined with respect to the first plane, and includes a core region in which the core is exposed; and
a first bottom surface parallel to the first plane; and
a second mirror structure having a concave shape which is formed from the cladding to the core, the second mirror structure including:
a third inclined surface that is parallel to the second direction, is inclined with respect to the first plane, and includes a core region in which the core is exposed; and
a second bottom surface parallel to the first plane;
a first optical connector that causes light to enter the first inclined surface; and
a second optical connector that light emitted from the third inclined surface enters.

9. An optical transmission module, comprising:
an optical waveguide sheet comprising:
a core extending in a first direction parallel to a first plane;
a cladding around the core;
a first mirror structure formed from the cladding to the core, wherein
the first mirror structure has a concave shape, and
the first mirror structure comprises:
a first inclined surface parallel to a second direction, wherein
the second direction is perpendicular to the first direction and parallel to the first plane,
the first inclined surface is inclined with respect to the first plane,
the first inclined surface includes a first core region, and
the first core region exposes the core; and
a first bottom surface parallel to the first plane; and
a second mirror structure extends from the cladding to the core, wherein
the second mirror structure has the concave shape, and
the second mirror structure comprises:

a second inclined surface parallel to the second direction, wherein
the second inclined surface is inclined with respect to the first plane,
the second inclined surface includes a second core region, and
the second core region exposes the core; and
a second bottom surface parallel to the first plane;
a first optical connector configured to transmit light to the first inclined surface; and
a second optical connector configured to receive the light emitted from the second inclined surface.

\* \* \* \* \*